(12) United States Patent
Horak

(10) Patent No.: US 6,481,566 B1
(45) Date of Patent: Nov. 19, 2002

(54) MOVING HEAD CONVEYOR SYSTEMS

(76) Inventor: Ralph M. Horak, 23 Spinnaker La., Mariner's Cove, Lake View New Orleans, LA (US) 70124

( * ) Notice: Subject to any disclaimer, the term of this patent is extended or adjusted under 35 U.S.C. 154(b) by 0 days.

(21) Appl. No.: 09/875,824

(22) Filed: Jun. 6, 2001

(51) Int. Cl.$^7$ ................................................ B65G 15/60
(52) U.S. Cl. ..................................... 198/812; 198/595
(58) Field of Search ................................ 198/544, 595, 198/812; 414/140.2, 140.3, 140.4

(56) References Cited

U.S. PATENT DOCUMENTS

| | | | | |
|---|---|---|---|---|
| 4,401,206 A | * | 8/1983 | Ikeda | 198/812 |
| 4,568,232 A | * | 2/1986 | Juelich et al. | 198/594 |
| 4,925,010 A | * | 5/1990 | Pallasvirta | 198/594 |
| 5,490,592 A | * | 2/1996 | Best et al. | 198/812 |
| 5,498,119 A | * | 3/1996 | Faivre | 198/812 |

OTHER PUBLICATIONS

Ralph M. Horak, Krupp Robins Proposal Proyecto Radomiro Tomic, Codelco, Chile, Bid DWGS. Oct. 15, 1996.

* cited by examiner

Primary Examiner—James R. Bidwell
(74) Attorney, Agent, or Firm—Ramon L. Pizarro

(57) ABSTRACT

An extensible conveyor system that uses idler shuttles that include a base with sides, a front section and a rear section, and a mechanism that allows the frame to be moved along a support, these mechanisms may be wheels, slides, bearings, bushings, or other carriers, the sides of the base being generally symmetrical. The idler shuttles also include an idler support frame that extends from the base at an angle, the angle may be perpendicular or any other angle, the idler support frame being mounted between the front portion and the rear portion, the front portion of the base being adapted for nesting within the rear portion of the base, so that several of the support frames can be nested against one another to reduce the overall space taken up by the shuttles when the conveyor system is in a retracted position.

16 Claims, 20 Drawing Sheets

SHOWN WITHOUT TRAVERSE DRIVE.
WORK WITH FIGS.: 9, 10, 11, 12

SHOWN WITHOUT TRAVERSE DRIVE.
WORK WITH FIGS.: 13, 14

SHOWN WITHOUT TRAVERSE DRIVE.
WORK WITH FIGS.: 15, 16

SHOWN WITHOUT TRAVERSE DRIVE.
WORK WITH FIGS.: 15, 17

SHOWN WITHOUT TRAVERSE DRIVE.
WORK WITH FIG.: 18

KNOWN ART

KNOWN ART

WORK WITH FIGS.: 3, 10, 11, 12

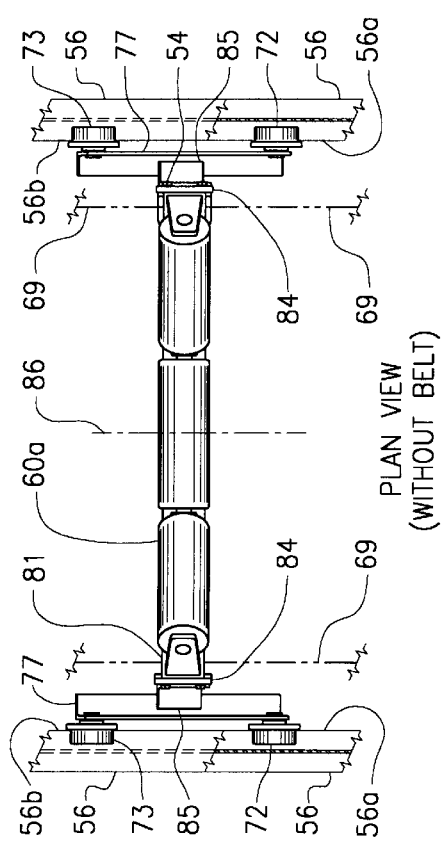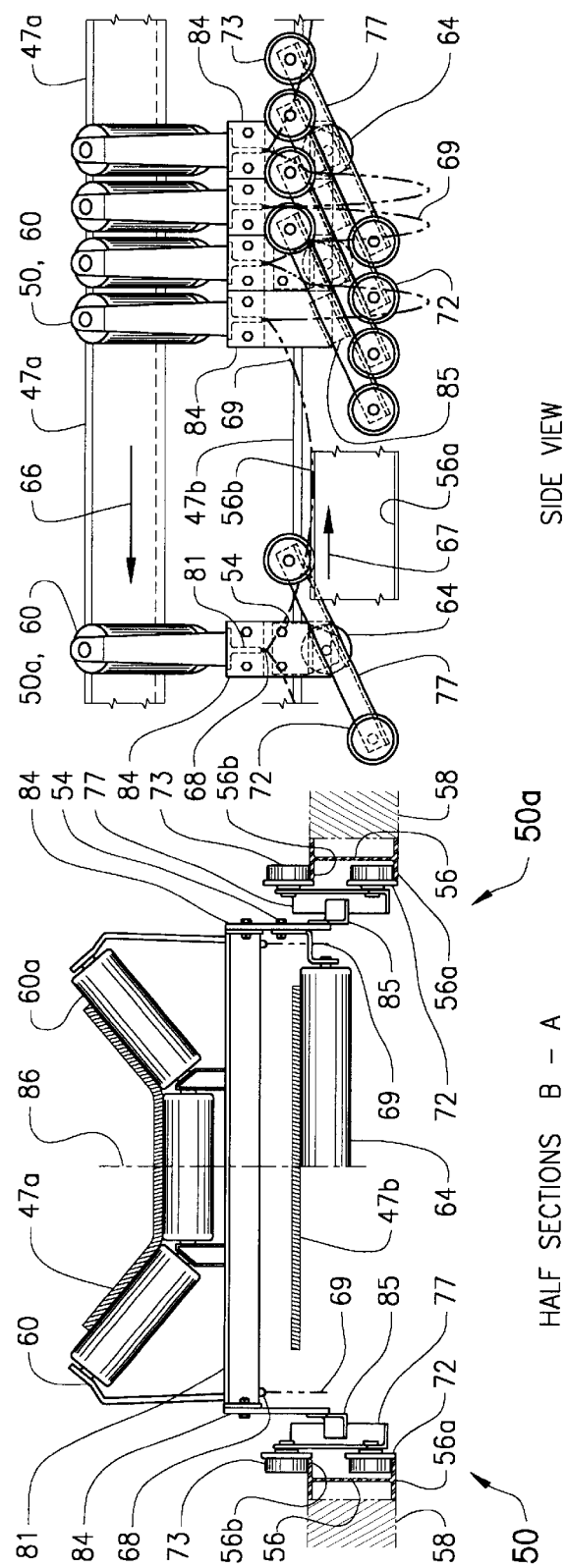
Fig. 11

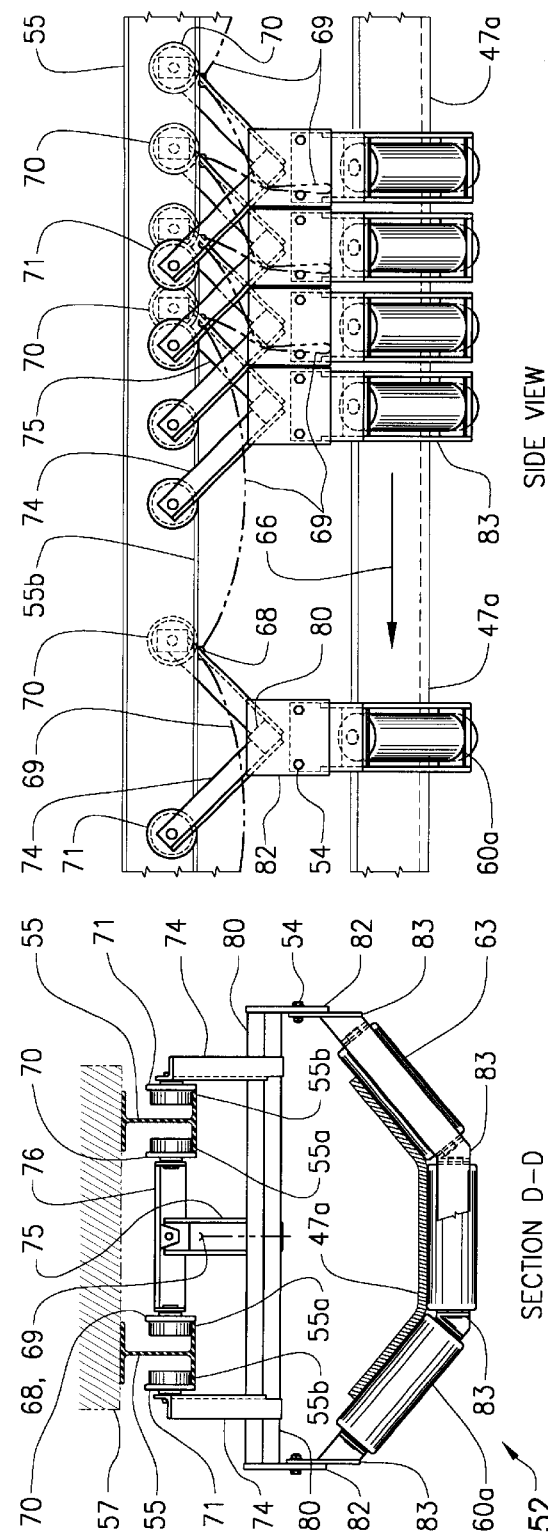
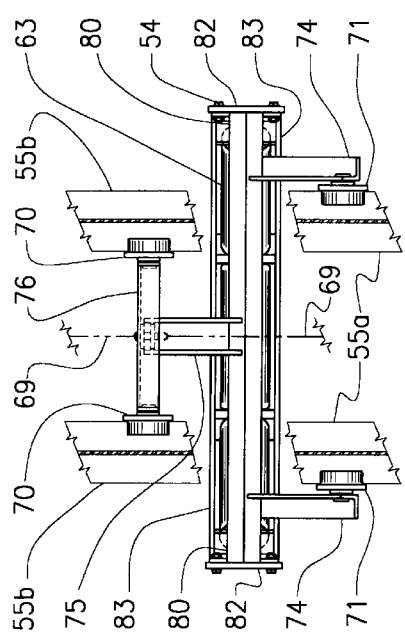
Fig. 13

HALF SECTIONS G — J
CEILING/FLOOR MOUNTED SHUTTLE SECTIONS
WITH TRAVELING CATENARY IDLERS

WORK WITH FIGS.: 5, 15

Fig. 18 KNOWN ART

HALF SECTIONS N – M
CEILING/FLOOR MOUNTED SHUTTLE SECTIONS
WITH FIXED CATENARY IDLERS

WORK WITH FIG.: 7

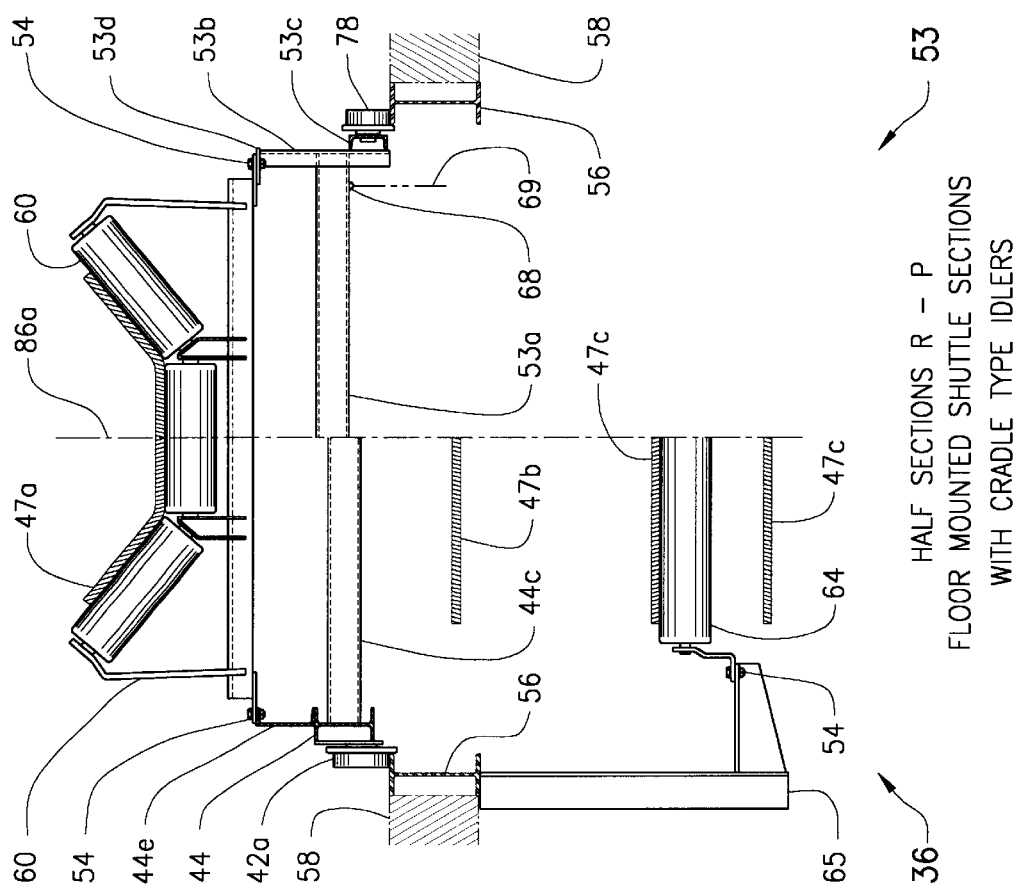
Fig. 20 KNOWN ART
HALF SECTIONS R – P
FLOOR MOUNTED SHUTTLE SECTIONS
WITH CRADLE TYPE IDLERS
WORK WITH FIGS.: 8, 19

MOVING HEAD CONVEYOR SYSTEMS

BACKGROUND OF THE INVENTION (a) Field of the Invention

This invention generally relates to idler supports that are movable and which are particularly suited for use in conveyor systems that employ an extensible boom or conveyor support section. More particularly, but not by way of limitation, to moving head systems that use sliding or moving supports to allow the extension of the head of the conveyor relative to the loading point of the conveyor.

(b) Discussion of Known Art

Moving or extensible head conveyor systems have gained acceptance due to their effectiveness in delivering materials to vessels or areas where uniform distribution of the material being delivered is important. Examples of known extensible head conveyors include the conveyor shown in U.S. Pat. No. 5,181,600 to Chappell et al. teaches the use of H-shaped sections that allow extension of a flexible endless belt to allow the extension or retraction of a belt supported on the H-frames.

While the Chappell et al. invention is an innovative support for small or generally light duty conveyor systems, there remains a need for providing extensible conveyor systems that provide stable support for handling heavy loads, as are encountered by shiploading systems, for example. Systems that are designed to carry heavy loads will require larger, stable structure that is resistant to buckling or other structural failure mode. An important drawback to this larger structure is that it typically takes up a large amount of space. Therefore, the moving idler supports that allow the conveyor to move takes up a large amount of space, and thus reduce the ability or degree to which the system can be collapsed or retracted.

SUMMARY

It has been discovered that the problems left unanswered by known art are solved by providing conveyor support frames having:

- a base with sides, a front section and a rear section, and a mechanism that allows the frame to be moved along a support, these mechanisms may be wheels, slides, bearings, bushings, or other carriers, the sides of the base being generally symmetrical; and
- an idler support frame that extends from the base at an angle, the angle may be perpendicular or any other angle, the idler support frame being mounted between the front portion and the rear portion, the front portion of the base being adapted for nesting within the rear portion of another base, so that several of the support frames can be nested against one another to reduce the overall space taken up by the support frames. Thus, it will be understood that the disclosed frame arrangement will allow an extensible conveyor belt system to extend from a very short collapsed position to a significantly longer extended position. Additionally, the fact that the disclosed structure allows compact stacking of the support frames, allows the provision or installation of a larger number of support frames for a given span of conveyor belt. The increased number of support frames will provide greater traveling distance between the extended and retracted lengths of the conveyor.

In accordance with one example of the disclosed invention, the base of the frame has been designed for mounting from a ceiling or other overhead support structure. With this configuration, it is contemplated that at least one, and preferably a pair of spaced apart I-beams would be used to define the track system that would support the wheels or moving mechanism of the idlerbase frame. As is well known, the I-beams will include a pair of end-caps that are separated by a web-portion. The end-caps have legs that project in a symmetrical fashion from both sides of the webs of I-beams. It is contemplated that one set of wheels or similar component of the moving mechanism will engage or cooperate with the lower leg or legs on one side of the web, while another set of wheels or similar component will cooperate with the upper leg or legs of the I-beam. This staggering will allow the base of the support frame to include support structure that allows one frame to nest within the next frame or stacked frames. It should also be understood that while the above and other advantages and results of the present invention will become apparent to those skilled in the art from the following detailed description and accompanying drawings, showing the contemplated novel construction, combinations and elements as herein described, and more particularly defined by the appended claims, it should be clearly understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which:

FIG. 11 illustrates Section A–B (from FIG. 10) of the floor a mounted "transpassing idler" assembly.

FIG. 13 illustrates Section D (from FIG. 4) of the traveling catenary idler assembly.

FIG. 20 illustrates Half-Sections Q and R (from FIG. 8) of the conventional cradle idler/shuttle sections.

DETAILED DESCRIPTION OF PREFERRED EXEMPLAR EMBODIMENTS

Figure 1:
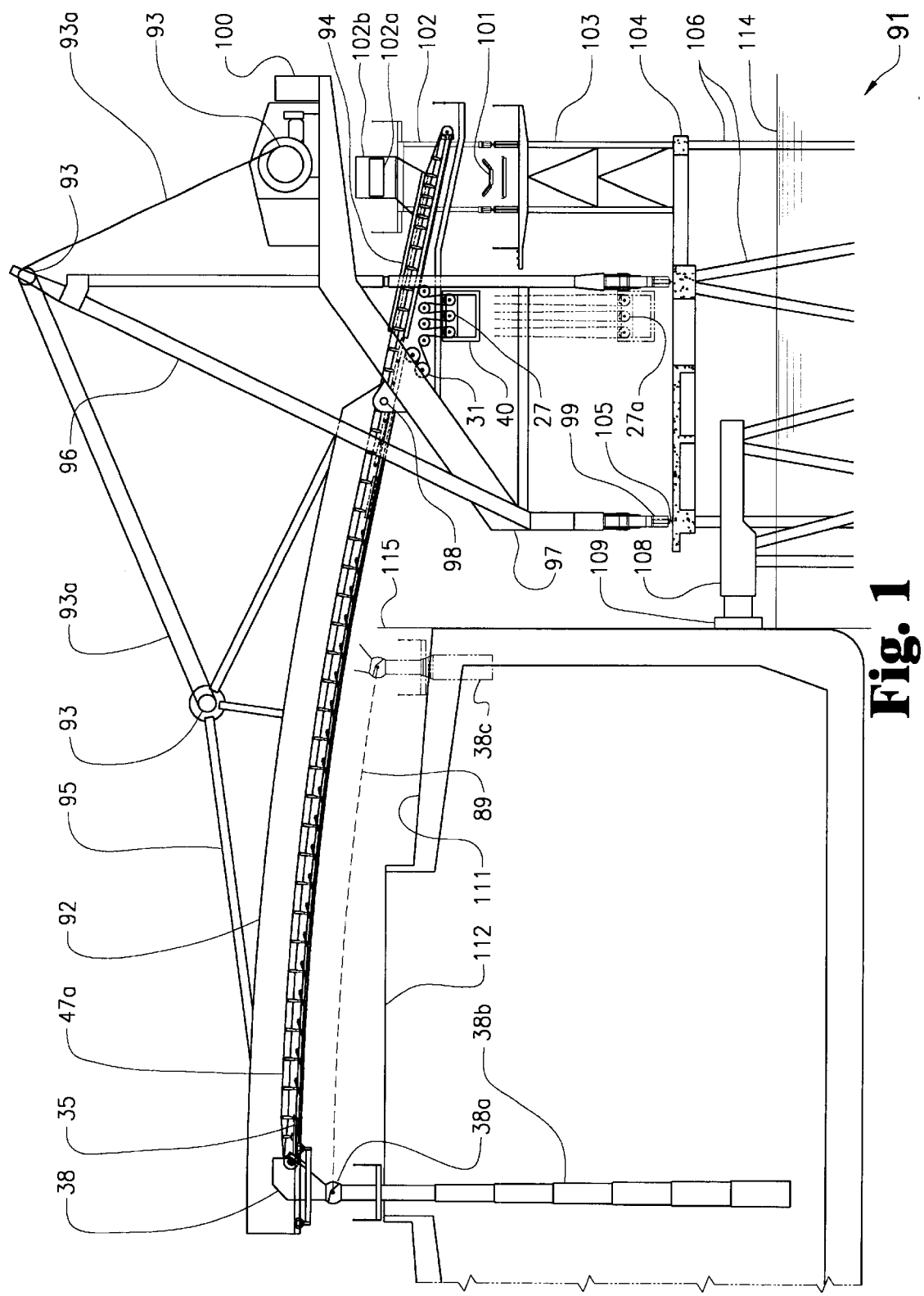
FIG. 1 is a side view of a traveling shiploader with a luffing boom, with the moving-head extended.

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

The enclosed drawings include discussions of the following configurations/arrangements with corresponding reference characters:

Extended compact moving-head with "transpassing idlers", conveyor general arrangement (GA) 20;
Retracted compact moving-head with "transpassing idlers", conveyor or general arrangement GA 20a;
Extended conveyor compact moving-head with "transpassing idlers", enlargement 20b;
Retracted conveyor compact moving-head with "transpassing idlers", enlargement 20c;
Extended belt loop type conventional conveyor shuttle with traveling catenary idlers, GA 21;
Retracted belt loop type conventional conveyor shuttle with traveling catenary idlers, GA 21a;
Extended compact moving-head with improved traveling catenary idlers, GA 22;
Retracted compact moving-head with improved traveling catenary idlers, GA 22a;
Extended/suspended moving-head with improved traveling catenary idlers, GA 23;
Retracted/suspended moving-head with improved traveling catenary idlers, GA 23a;
Extended belt loop type conventional conveyor shuttle with stationary catenary idlers, GA 24;
Retracted belt loop type conventional conveyor shuttle with stationary catenary idlers, GA 24a;
Extended belt loop type conventional conveyor shuttle with cradle idlers, GA 25;
Retracted belt loop type conventional conveyor shuttle with cradle idlers, GA 25a;

MOVING-HEAD ASSEMBLY—Illustrated Components

Compact loop-less moving-head assembly, floor supported 35;
Compact loop-less moving-head assembly, ceiling supported (suspended) 35a;
Wire rope winch of moving-head traverse drive system 37;
Moving-head assembly frame 41;
Moving-head frame member 41a;
Moving-head frame leg 41b;
Moving-head frame cross member 41c;
Moving-head frame pulley support 41d;
Moving-head frame idler support 41e;
Moving-head frame vertical support member 41f;
Moving-head wheel assembly 42.

SHUTTLE ASSEMBLIES—Illustrated Components

Conventional belt loop type shuttle assembly 36;
Shuttle wheel assembly 42a;
Shuttle assembly frame 44;
Shuttle frame member 44a;
Shuttle frame leg 44b;
Shuttle frame cross member 44c;
Shuttle frame pulley support 44d;
Shuttle frame idler support 44e.

PULLEYS—Illustrated Components

Bend pulley 26;
Take-up pulley with moving-head in extended position 27;
Take-up pulley with moving-head in retracted position 27a;
Take-up pulley of shuttle conveyor 27b;
Tail pulley 28;
Snub pulley 29;
Head pulley 30;
Drive pulley of conveyor belt 31;
Stationary shuttle bend pulley 32;
Traveling shuttle tail pulley 33;
Take-up pulley frame (carriage) with moving-head in extended position 34;
Take-up pulley frame (carriage) with moving-head in retracted position 34a;
Conveyor counterweight assembly 40;
Pillow block with bearing 45;
Pulley shaft 46.

CHUTES—Illustrated Components

Discharge Chute 38;
Chute gimbal 38a;
Telescoping chute, extended 38b;
Telescoping chute, retracted 38c;
Telescoping chute in park position 38d;
Belt wiper 39.

IDLER ASSEMBLY-IDLERS—Illustrated Components

"Transpassing idler" assembly without return idler 50;
"Transpassing idler" assembly with return idler 50a;
Equalizer beam 76;
Load equalizer arm 77;
"Transpassing idler" frame cross member 81;
"Transpassing idler" frame leg 84;

"Transpassing idler" leg connecting bracket 85;
Stationary catenary idler assembly 51;
Traveling catenary idler assembly 52;
Improved traveling catenary idler assembly 52a;
Combined improved traveling catenary idler assembly 52b;
  Catenary idler frame cross member 80;
  Catenary idler frame hanger 82;
  Combined catenary idler frame hanger 82a;
  Catenary idler bracket assembly 83;
  Cradle idler assembly 53;
  Cradle idler frame cross member 53a;
  Cradle idler frame leg 53b;
  Cradle idler load equalizer member 53c;
  Cradle idler support bracket 53d;
  Standard troughing idler 60;
  Idled roller 60a;
  Standard impact idler 61;
  Standard transition idler 62;
  Special catenary idler 63;
  Standard flat return idler 64;
  Idler support bracket 65.

CONVEYOR-BELT

Conveyor belt 47;
  Carrying side of belt 47a;
  Empty or return side of belt 47b;
  Shuttle belt loop 47c;
  Take-up belt loop 47d;
  Standard conveyor section 49;
  Direction of travel for carrying or troughing side of belt 66;
  Direction of travel for empty belt 67.

SUPPORT STRUCTURE

Support beam, ceiling mounted design 55;
  Ceiling mounted beam, inside track 55a;
  Ceiling mounted beam, outside track 55b;
Support beam, floor mounted design 56;
  Floor mounted beam, lower track 56a;
  Floor mounted beam, upper track 56b;
Ceiling structure 57;
  Ceiling hanger structure 57a;
Floor structure 58;
  Supporting leg structure 58a.

ACCESSORIES AND HARDWARE

High tension wire rope of moving-head traverse drive winch 43;
Low tension wire rope of moving-head traverse drive winch and take-up 43a;
High tension wire rope of moving head or shuttle traverse drive winch 43b;
  Mounting fasteners 54;
  Anchor shackle 68;
  Connecting chain 69;
  High tension wire rope sheave 79;
  Low tension wire rope sheave 79a;
  Standard conveyor hood cover 90;

WHEEL ASSEMBLIES

Inside wheel assembly 70;
Outside wheel assembly 71;
Lower wheel assembly 72;
Upper wheel assembly 73;
Front wheel support 74;
Rear wheel support 75;
Cradle idler wheel assembly 78;

DRAFTING TERMINOLIGY USED IN ACCOMPANYING DRAWINGS

Centerline conveyor/moving-head 86;
Centerline conveyor/shuttle 86a;
Centerline headchute in extended position 87;
Centerline headchute in retracted position 87a;
Centerline loading point 88;
Travel distance of moving-head 89;
Travel distance of conventional shuttle with traveling catenary idlers 89a;
Travel distance of moving-head with improved traveling catenary idlers 89b;
Travel distance of conventional shuttle with stationary catenary idlers 89c;
Travel distance of conventional shuttle with cradle idlers 89d.

SHIPLOADER

Traveling shiploader with luffing boom 91;
Shiploader boom in highest operating position 92;
Shiploader boom in lowest operating position 92a;
Shiploader boom in parked position 92b;
Boom hoisting/luffing equipment 93;
Hoisting/suspension wire rope 93a;
Shiploader boom conveyor 94;
Boom suspension 95;
Shiploader upper gantry structure 96;
Shiploader lower gantry structure 97;
Boom pivot (luffing) 98;
Shiploader traversing wheel/bogie assembly 99;
Shiploader counterweight box 100.

DOCK-DOCK CONVEYOR

Dock conveyor 101;
Dock conveyor tripper 102;
  Tripper head pulley 102a;
  Tripper transfer chute 102b;
Dock conveyor support structure with rails 103;
Dock structure 104;
Shiploader rails 105;
Supporting marine piles 106;
Dolphin structure 108;
Fendering device 109.

SHIP-BARGE

Figure 3:
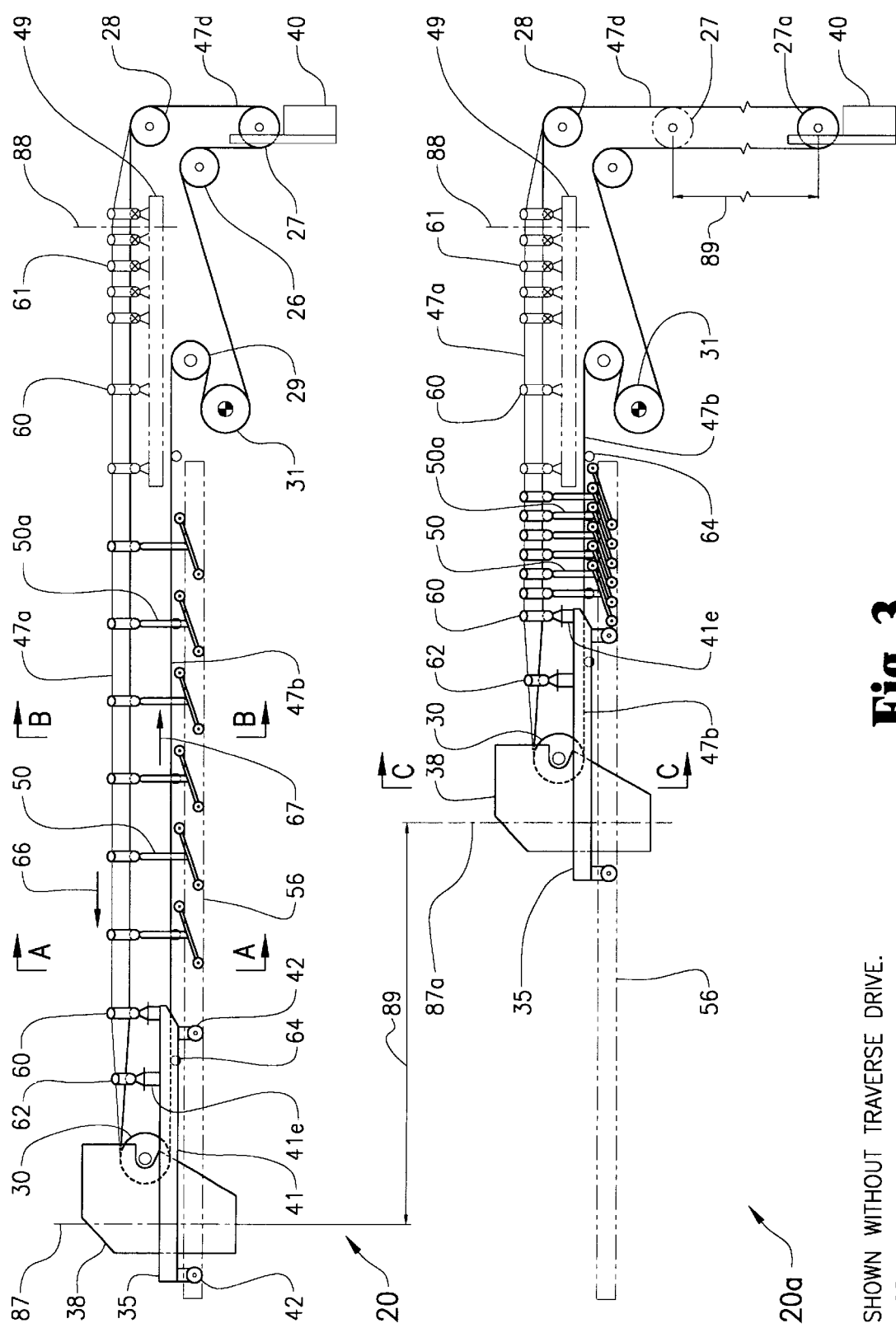
FIG. 3 is a side view of a conveyor equipped with a compact moving-head and "transpassing idlers."

Ocean going vessel (60,000 DWT ship) 111;
Ship's hatch opening 112;

Standard river barge (1,500 DWT) 113;

Water elevation at dockside 114;

Fenderline 115;

Turning now to FIG. 3 where a typical installation of a multi-track moving-head (20a) has been shown installed on a long a feed conveyor, as typically used with bins or covered storage at buildings or on shorter boom conveyors found on booms of stackers, spreaders, barge loaders and ship loaders (91) and the like. The moving-head assembly frame (41) (structure) supports a head pulley (30) at the location of discharge chute (38), the transition idler, or idlers, (62) and a standard troughing idler (60). Individual track (rail) mounted idler assemblies (50 and 50a) allow changes in the conveyor length without the use of additional traveling shuttle tail pulley (33) and as well as a fixed bend pulley (32) as commonly found in conventional shuttles (FIG. 4).

This compact moving-head 20 arrangement (illustrated in FIGS. 3, 9, 10, 11, and 12) has been equipped with idlers referred to herein as a "transpassing idlers." The compact moving-head 20 has been illustrated as a system using transpassing idler assemblies without the use of a return idler. A system with a return idler has also been illustrated in the enclosed drawings. These systems may also be described as "multi track moving-head assemblies," (20) indicating the presence of multiple tracks utilized for the traveling, transpassing idlers 50, 50a. Generally, three (corner) wheels and/or corresponding tracks (not shown here) are required in order to allow stacking of all wheels and idlers in the utilized compact manner. These conveyor systems at hand run on four tracks (one for each wheel of the idlers). The illustrated tracks have been arranged in a manner that allows the front (lower) wheels (72) of one idler assembly (50) to pass under the rear (upper) wheels (73) of an adjacent idler assembly (50a) i.e. "transpassing idler". In the illustrated examples, the four required tracks (56a and 56b) are defined by two of the flanges of the two floor mounted standard steel beams (56), shown as I-beams, but may also be C-sections or similar arrangements that face one another. These beams 56 support the wheels of the moving-head assembly 41. The transpassing idlers can be supported from a floor-mounted beams (56) or suspended beams (55) above the conveyor.

Figure 4:
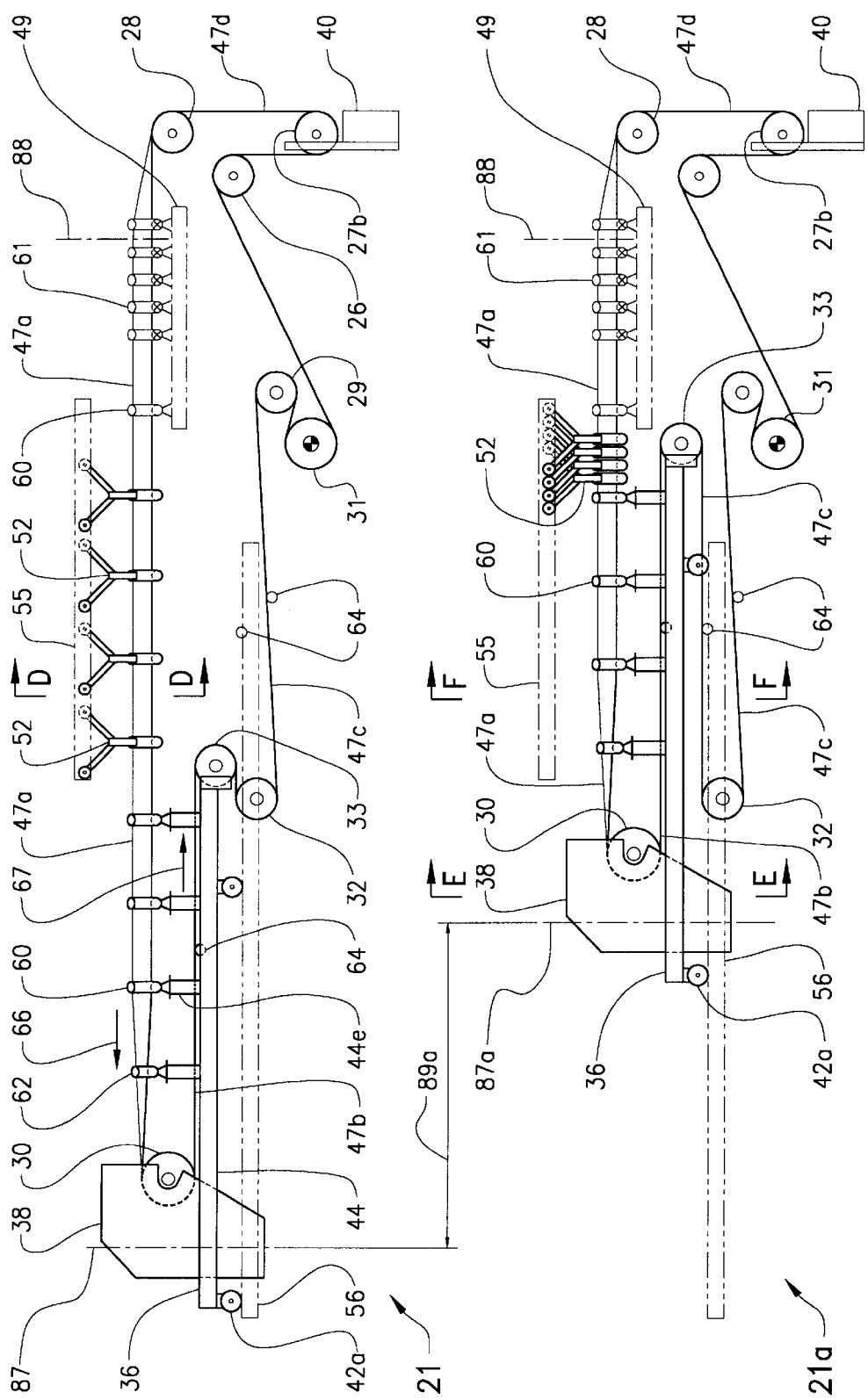
FIG. 4 is a side view of a conventional shuttle conveyor with traveling catenary idlers.
Figure 14:
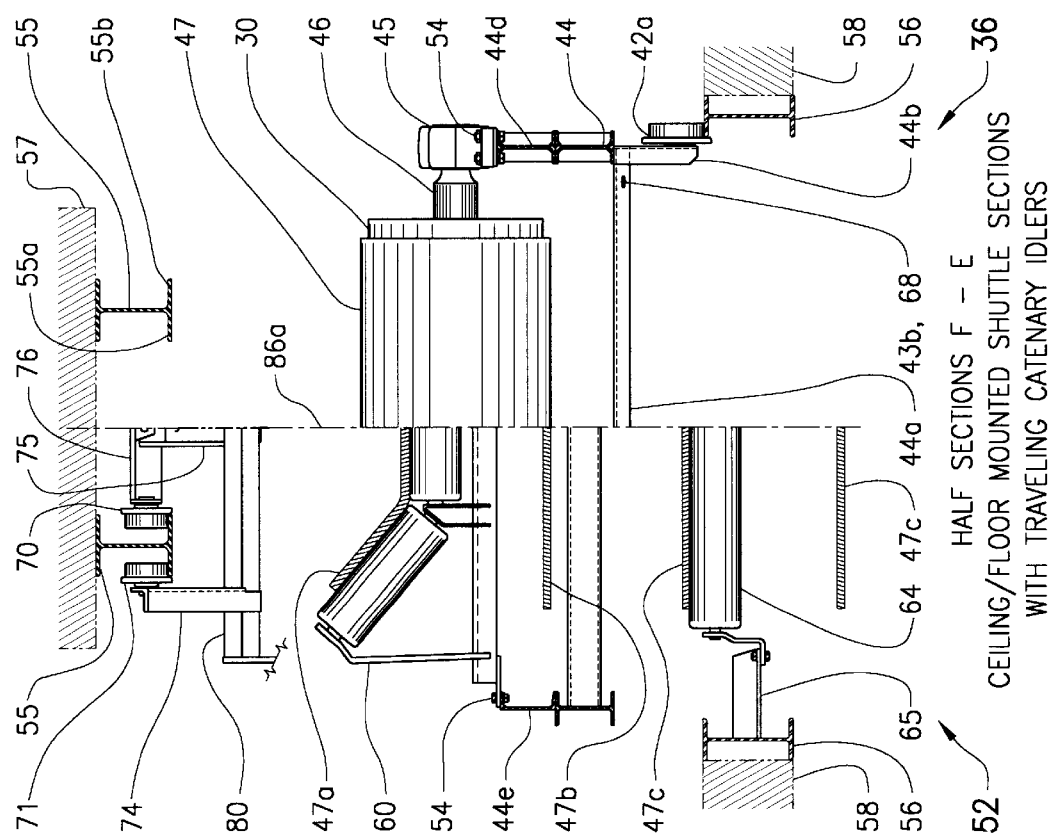
FIG. 14 illustrates Sections E and F (from FIG. 4) of the traveling catenary idler and conventional shuttle sections.

In a suspended arrangement, illustrated in FIGS. 4, 13 and 14, the traveling catenary idlers (52) are equipped with four wheels, which are part of an inside wheel support assembly 70 and an outside wheel support assembly 71, which in turn are mounted on four separate tracks. Instead of commercial rails, two wide flanged steel beams (55) are suspended from the ceiling structure (57) on each side of the conveyor. The idler wheels (70, 71) ride both the inner (55a) and outer flange (55b) of both overhead beams. As shown on FIG. 4, when the shuttling head is retracted the front or outside wheels (71) of an idler assembly (52) can pass the rear or inside wheels (70) of the adjacent assembly (52). This reduces the required clearances between the special catenary troughing idlers (63) when the conveyor is in a retracted position, shown in FIG. 4, to about one and a half inch (1½"). The disadvantage of this solution is that the front (71) and rear wheel (70) assemblies are blocking three sides (left, right and bottom) of each steel beam (55) allowing only for ceiling mounting or suspension. Ceiling suspension requires a second set of floor mounted beams (56) or tracks for the shuttle head assembly. Also, overhead, ceiling mounted systems are not well suited for use with (standard) conveyor hood covers (90) as shown on FIG. 12, therefore require the construction of a specially built enclosure or building when these must be covered.

Figure 5:
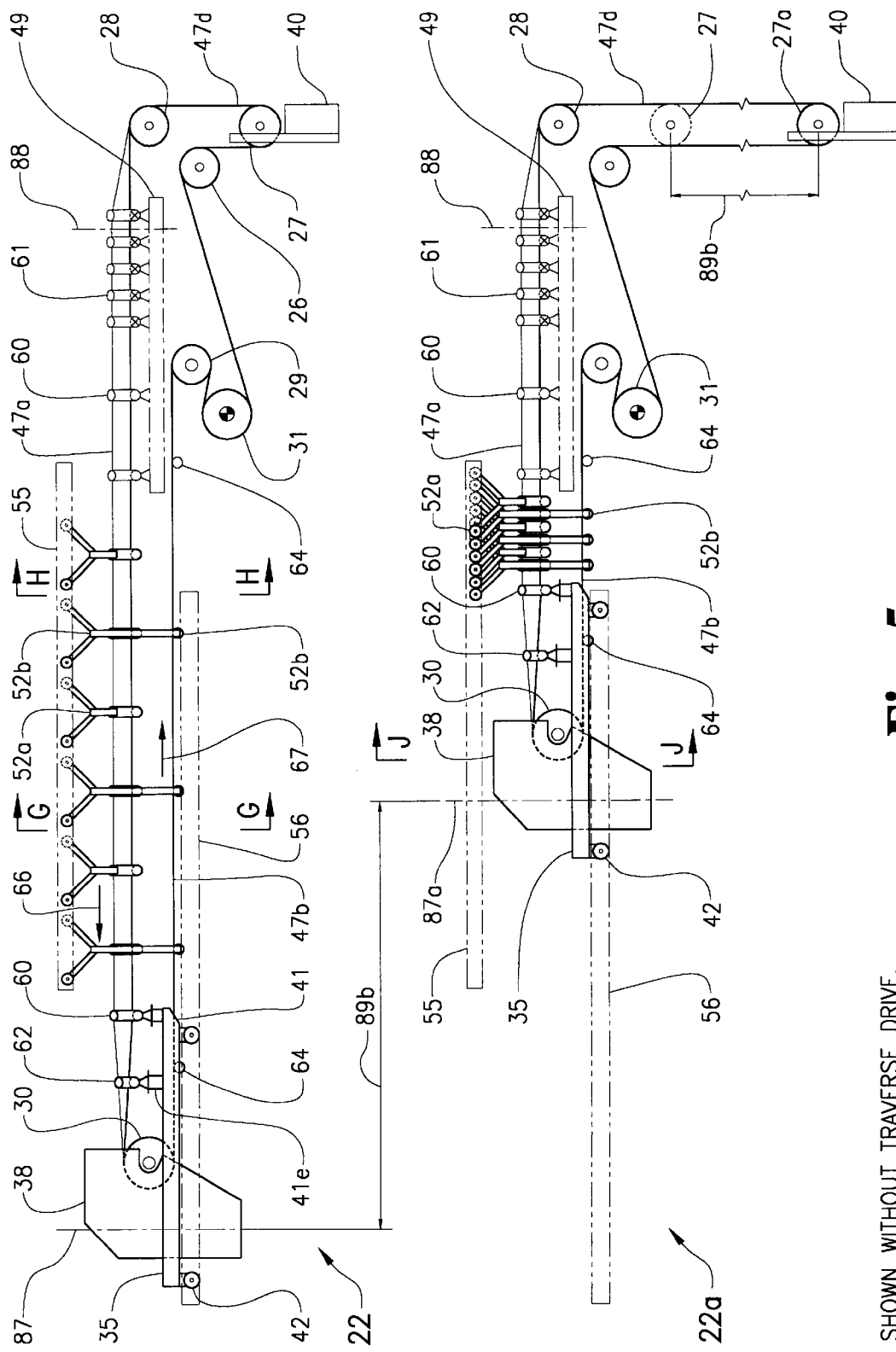
FIG. 5 is a side view of a compact moving-head conveyor with the disclosed improved traveling catenary idlers.
Figure 15:
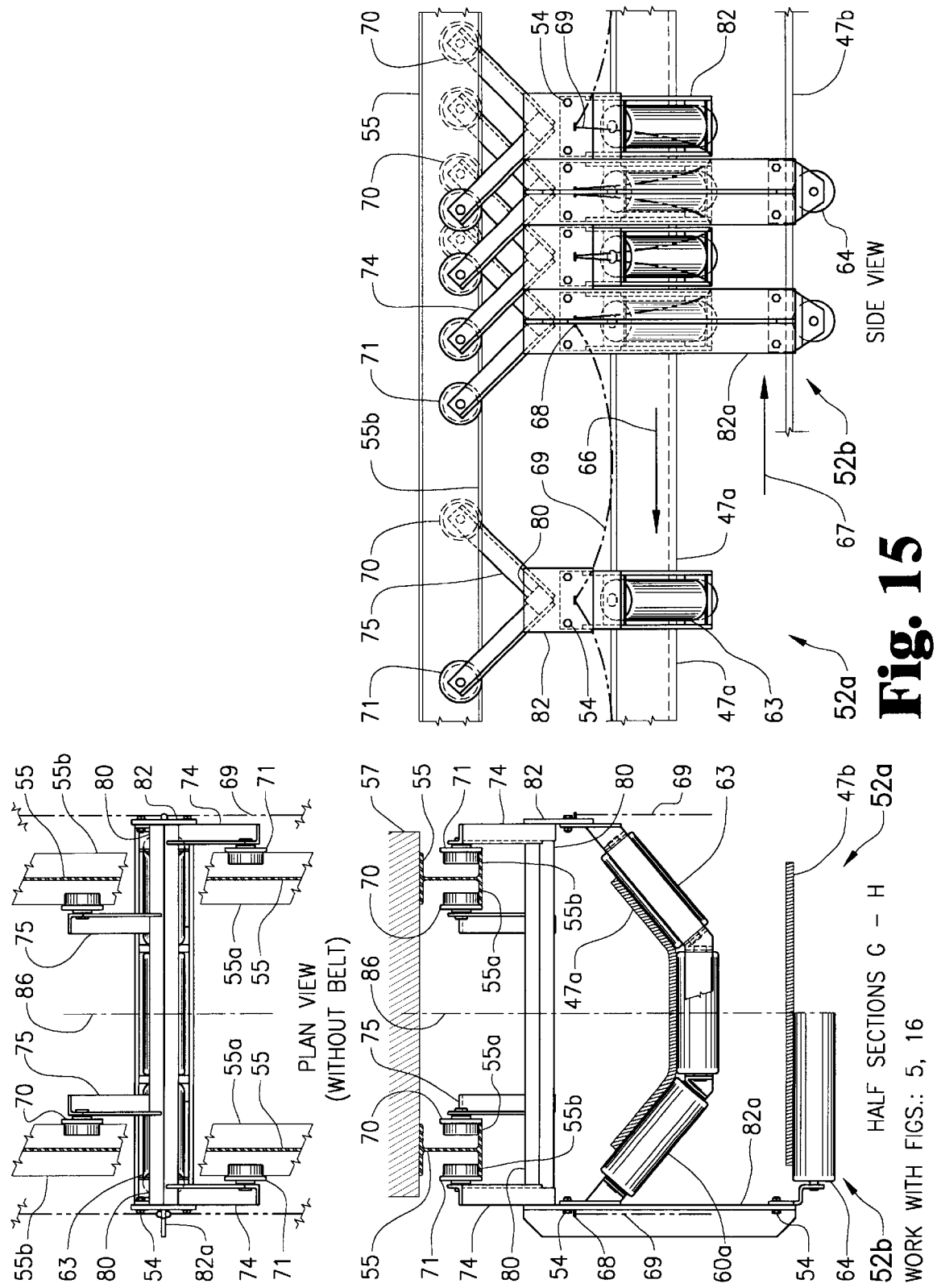
FIG. 15 illustrates Half-Sections G and H (from FIG. 5) of the improved traveling catenary idler assembly.
Figure 16:
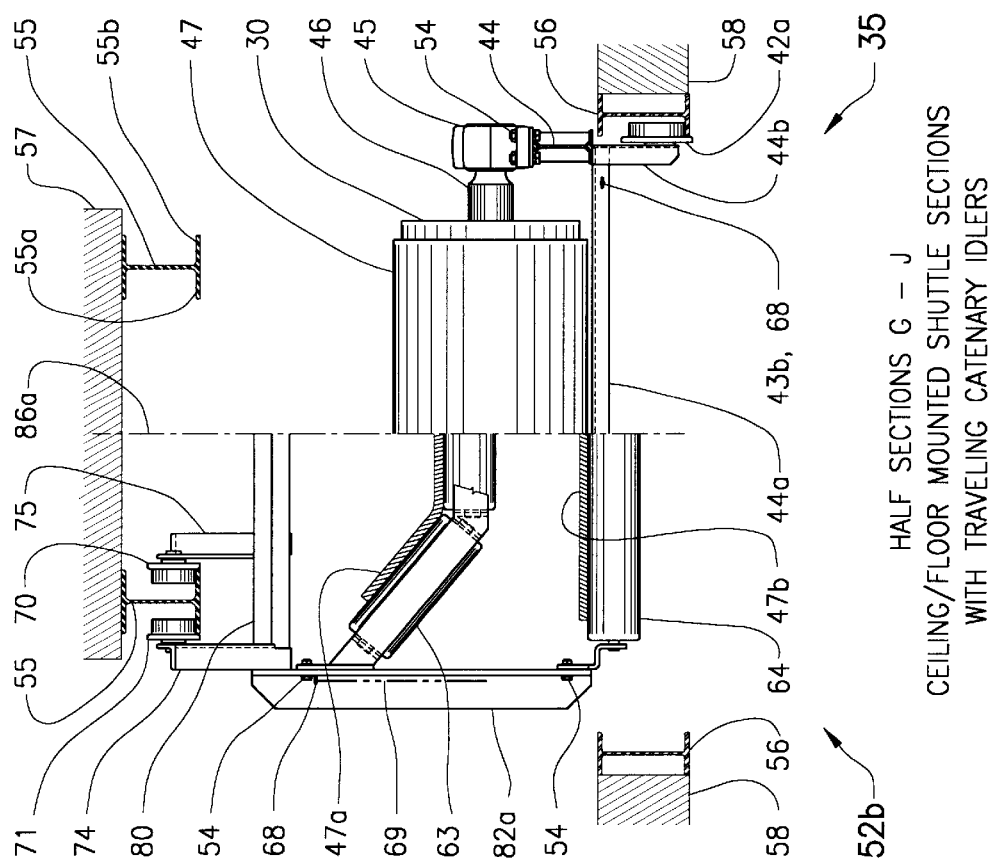
FIG. 16 illustrates Half-Sections G and J (from FIG. 5) of the improved traveling catenary idler and compact moving-head sections.

Another version of the shuttle (21) and catenary idler arrangement is shown on FIG. 5, 15 and 16, where the conventional loop type shuttle assembly (21) or (36) is replaced with the combination of a floor mounted compact moving-head (22, FIG. 5) and improved traveling catenary idlers (52a) and (52b). Idlers of the known solutions were simplified by eliminating the use of an equalizer beam (76), by widening the tracks and by incorporating flat return idlers (64) with additional support hangers (82a), allowing use of the arrangement in conjunction with a compact moving-head (35).

Figure 6:
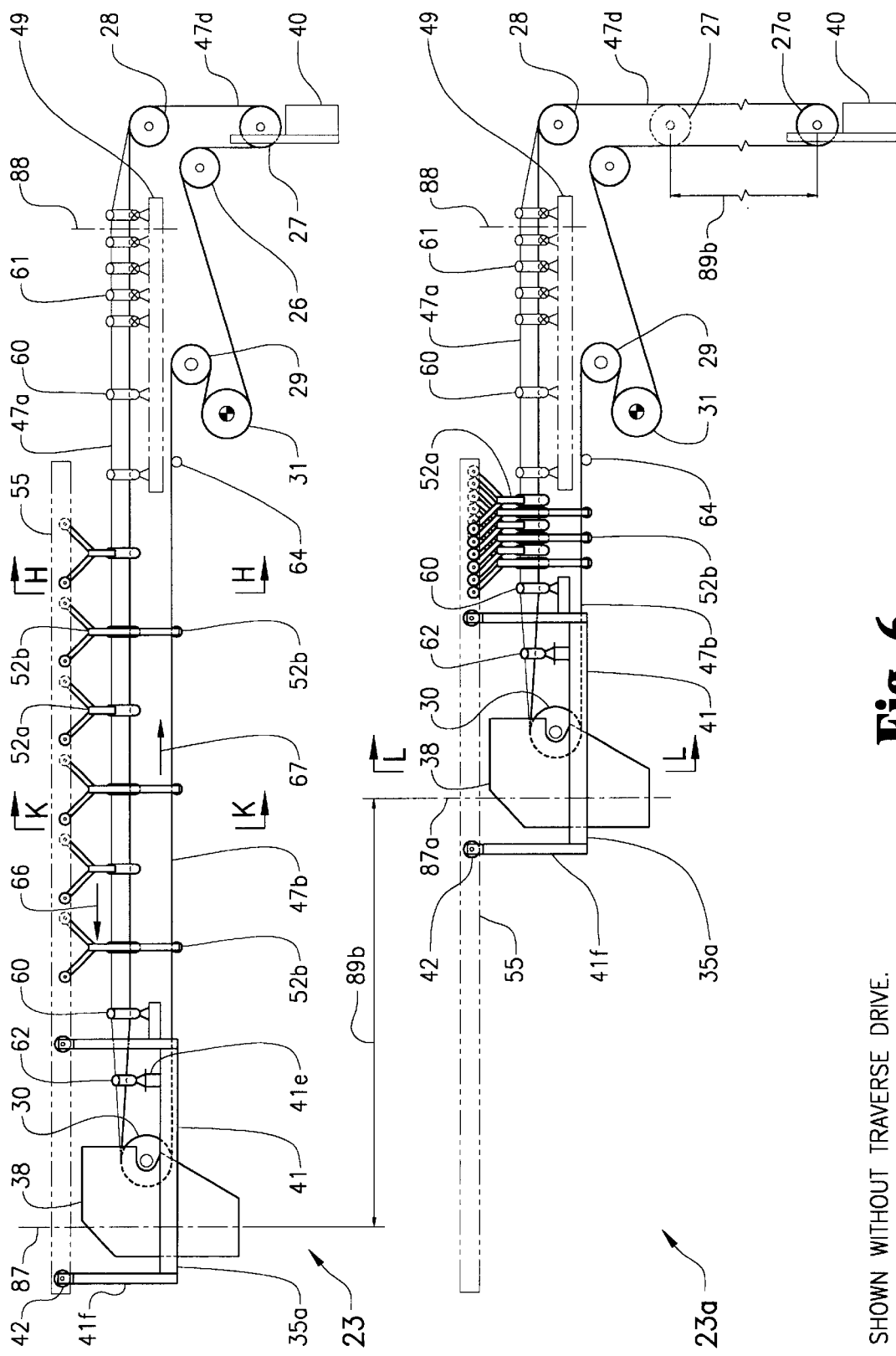
FIG. 6 illustrates the compact suspended moving-head conveyor with improved traveling catenary idlers.
Figure 17:
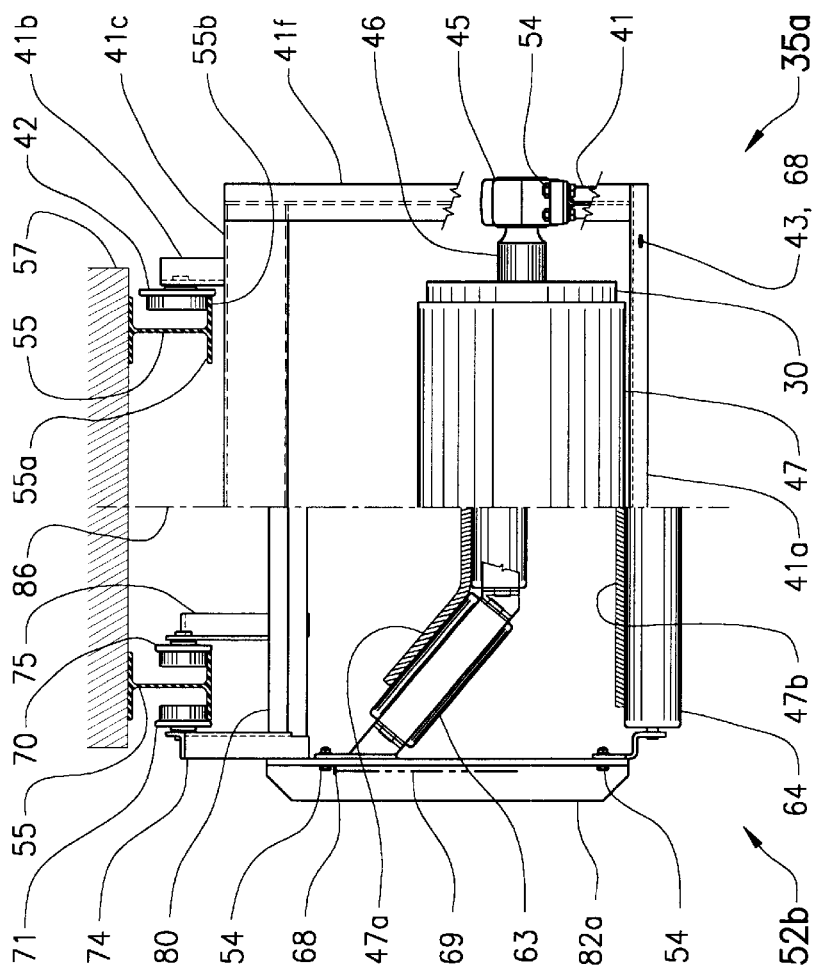
FIG. 17 illustrates Half-Sections K and L (from FIG. 6) of the improved traveling catenary idler/suspended moving-head sections.

Still another version of a moving head 23 arrangement is shown on FIG. 6, 15 and 17. Here, the floor mounted compact moving-head assembly (35) is replaced by the combination of suspended compact moving-head assembly (35a) and improved traveling catenary idlers (52a) and (52b). This system requires only two ceiling mounted (suspended) steel beams (55), which makes the system lighter and less complicated in comparison with the previously mentioned systems of FIGS. 4 and 5. However, it is still not suitable to be enclosed with (standard) conveyor hood covers (90), therefore requiring the utilization of an enclosed building.

Figure 7:
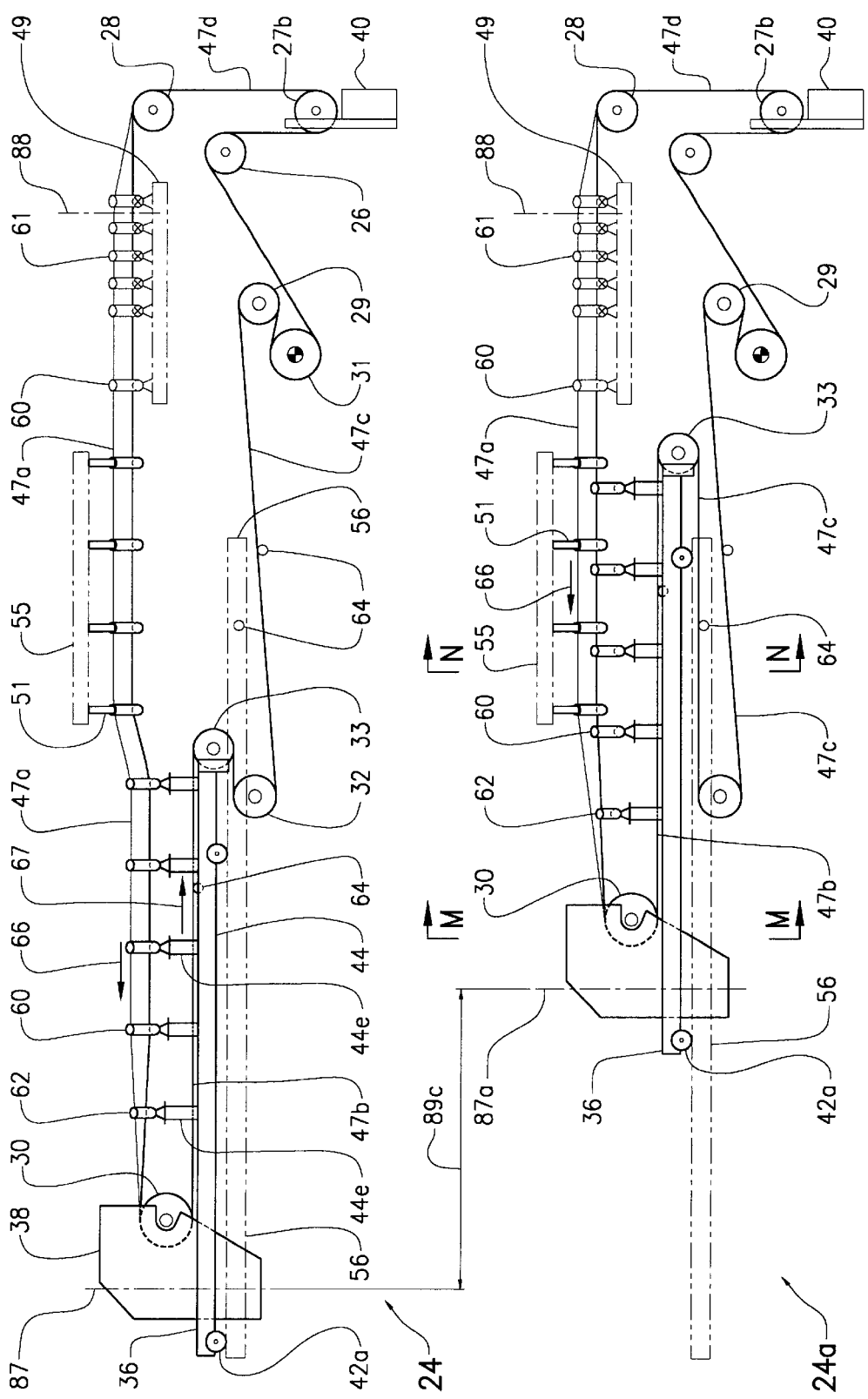
FIG. 7 illustrates the conventional shuttle conveyor with stationary catenary idlers.
Figure 18:
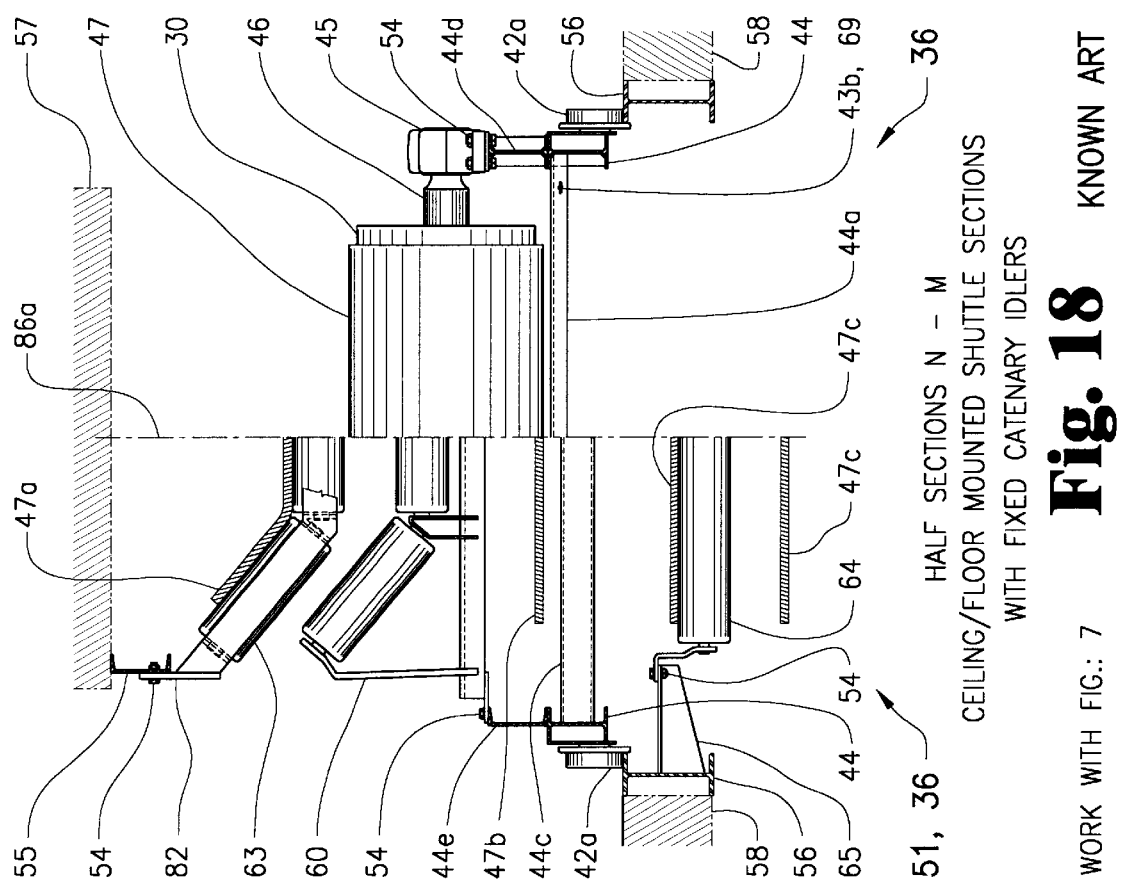
FIG. 18 illustrates Half-Sections M and N (from FIG. 7) of the stationary catenary idler and conventional shuttle sections.

In a conventional belt loop type shuttle arrangement (24) or (36), illustrated in FIGS. 7 and 18, a traveling structure (44) is equipped with standard carrying (60), transition idler(s) (62) and return idler(s) (64) on standard spacing. This structure (44) moves under a second fixed set of suspended or catenary troughing idlers (51), which support the belt (47a). The shuttle assembly (36) is also equipped with its own traveling tail pulley (33) and an additional fixed bend pulley 32, mounted on the main conveyor structure. These two pulleys (32 and 33) create a constant belt loop (47c) to maintain a constant belt length and tension. The gained travel distance (89c) of the shuttle is always smaller than the shuttle structure and therefore it is less then half the conveyor length. Additionally, this type of conveyor assembly needs additional vertical and horizontal space to accommodate the traveling shuttle tail pulley (33) and the corresponding belt loop (47c), as compared to other conveyor assemblies. The shuttle wheel assemblies (42a) are mounted on two rails (56) to support the shuttle mechanism (36), creating substantial and concentrated traveling dynamic loads.

A known variation on the traditional system (25) involves the use of traveling "cradle" idler assemblies on two rails. (See FIGS. 8, 19 and 20.) These idler assemblies (53) are mounted on three wheels (78) in a narrow "tee" (T) formation staggered on the rail. When the shuttle (36) is retracted, this system can reduce the cradle type troughing idler (63) spacing by 30–40%. Among the disadvantages of this system is the tendency of the idler assemblies (53) to miss-track due to their asymmetrical sideways T-shape. Also, sufficient space or clearance must be allowed for the shuttle tail pulley (33) travel.

Figure 9:
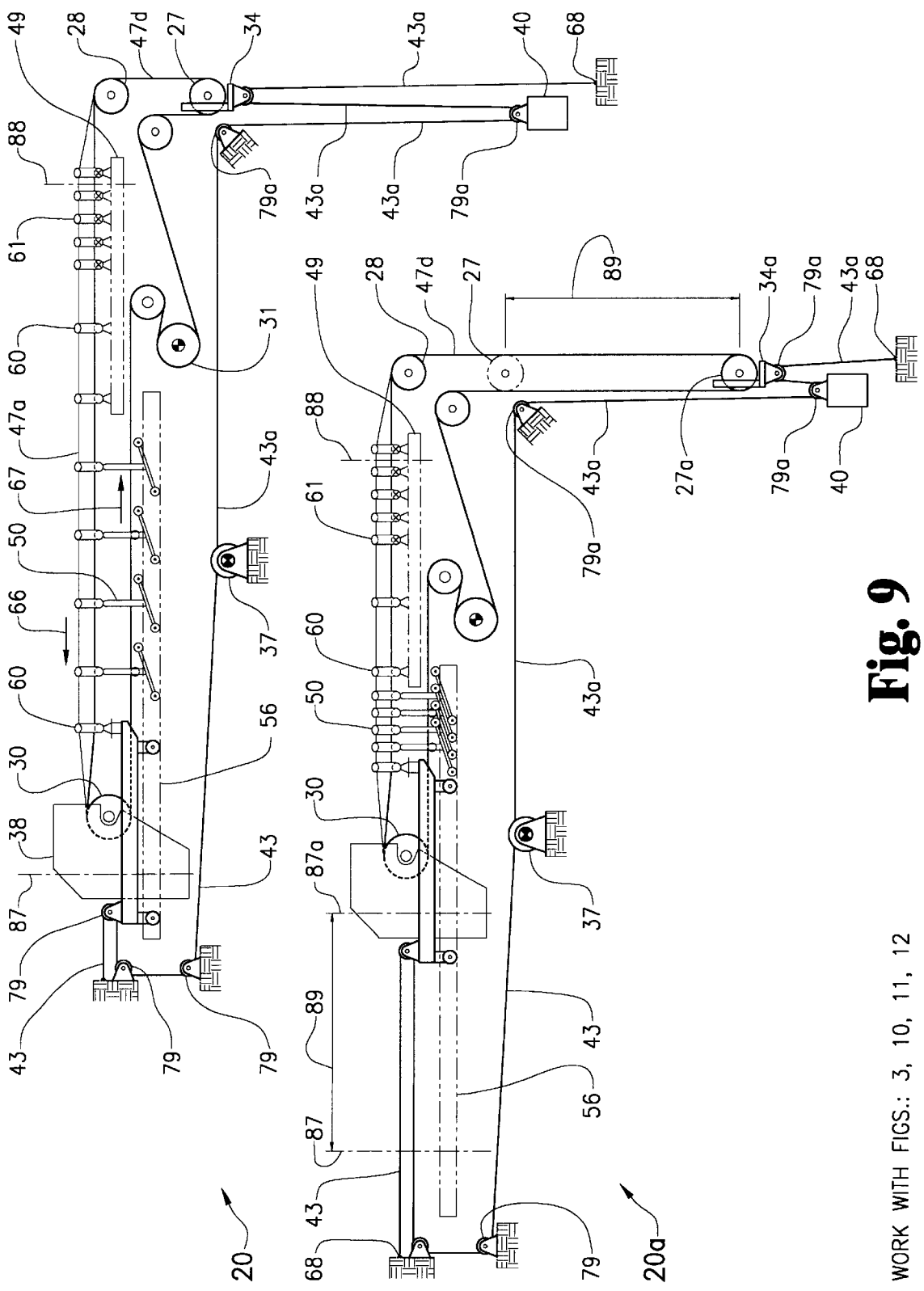
FIG. 9 illustrates the compact moving-head with "transpassing idlers" and "constant counterweight take-up," in the extended and retracted conditions.

In the disclosed invention a conventional take-up may be utilized. In this type of take-up, the counterweight needs to be lifted while the moving-head is being extended. Another solution, disclosed here on FIG. 9, is an integral moving-head and counterweight system through a wire rope reeving mechanism. This take-up system is termed "constant counterweight take-up," indicating that during moving head travel (89) the change in head end belt length is compensated by the difference of the simultaneously moving take-up pulley positions (27 and 27a), and by a counterweight (40) that maintains its constant position.

The "multi-track" system also enjoys other advantages over the traditional designs described above. "Multi track" requires minimum three (or maximum four) tracks to function in comparison with conventional two track systems. The name multi track, however, does not mean that this system needs more tracks than utilized with conventional shuttle systems. The multiple number of tracks is gained by utilizing two flanges of each steel beam. Thus, the multi track system requires the utilization of only two steel beams (56) versus the shuttle system with traveling catenary idlers, which requires four steel beams (55 and 56).

The larger front, or lower, (72) to rear, or upper, wheel (73) distance of a transpassing idler assembly (50, 50a) eliminates the belt-tracking problem observed in traveling cradle idler (53) systems. Substantial increases in travel length (89) over standard systems are possible. The ratio of retracted distance to conveyor length is also dramatically improved. Clearly, the "multi-track" type shuttle or moving head with the transpassing idler system represents a large step forward in conveyor design. The disclosed "compact loopless moving-head" system combined with the "transpassing idlers" results in conveyor systems that are lighter more flexible than known designs. Additionally, the disclosed systems require fewer high tension pulleys, shorter and lighter moving-head structure, and result in idlers that stack closer, creating an increased range of travel, while maintaining the ability to utilize standard conveyor hood covers.

GENERAL ARRANGEMENTS

FIG. 1 shows a traveling shiploader (91) with luffing boom (92) and its moving-head (41) or (35) extended. The traveling shiploader (91) is shown (FIG. 1) on a dock structure (104) associated with a dock conveyor (101) and a traveling tripper (102) to transfer any bulk materials from the dock conveyor onto the boom conveyor (94). An ocean going vessel or ship (111) is moored against the fenders (109) attached to the breasting dolphins (108). The ship is being loaded through the hatch opening (112) by the boom conveyor (94) and the moving head (35) assembly comprised of the head chute (38) the gimbal (38a) and the telescopic chute (38b). The boom conveyor (94) comprises of a fixed receiving or tail end and the moving-head (35) end. Utilization of the transpassing idler assemblies (50 and 50a) facilitates a much longer head end travel (89) versus conventional shuttle systems (36). The moving-head travel (89) is the net difference between the extended length and the retracted length. In the extended condition the traveling transpassing idlers (50 and 50a) are spaced at the required standard troughing idler spacing by means of connecting chains (69).

Figure 2:
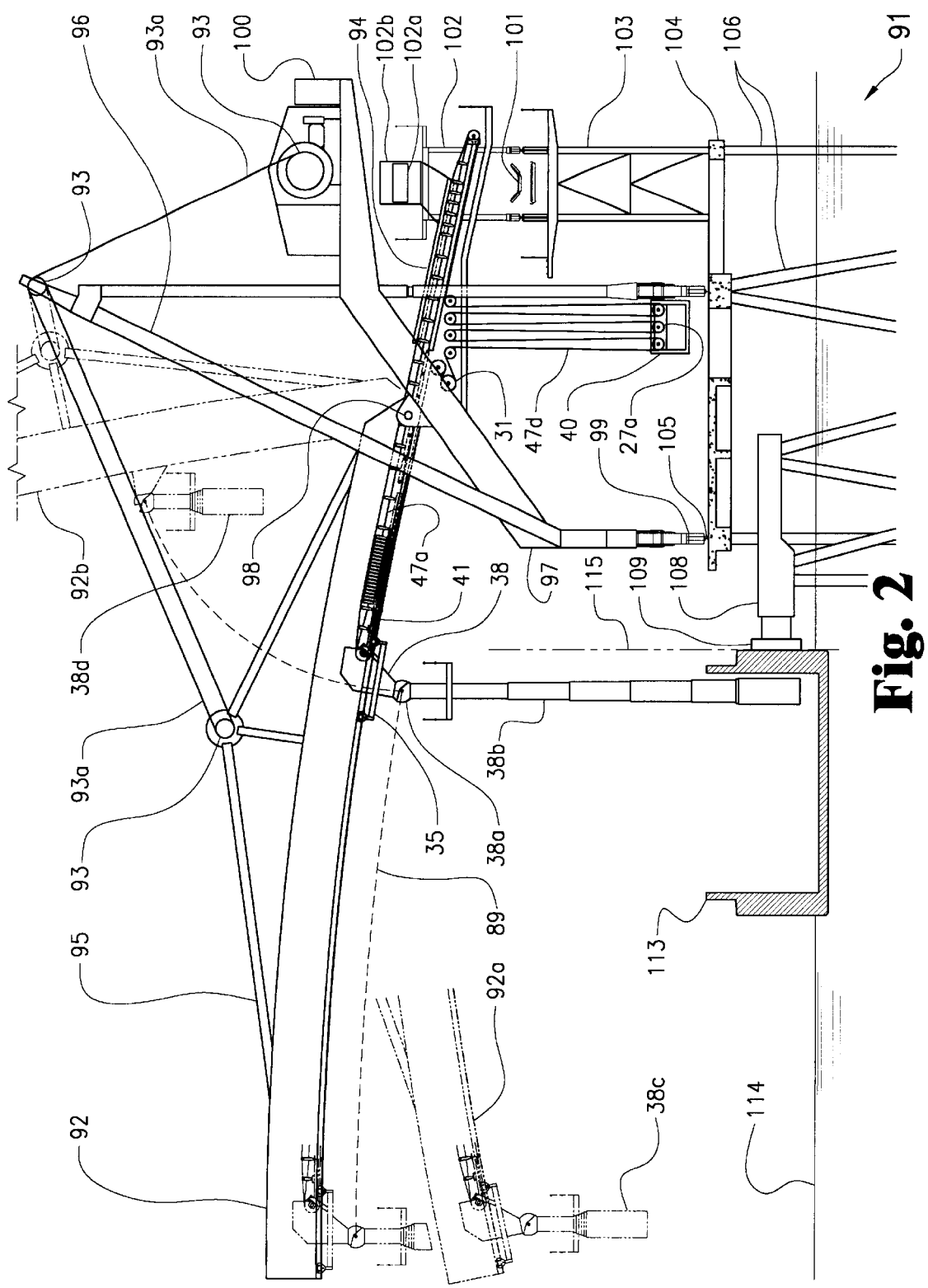
FIG. 2 is a side view of the traveling shiploader with a luffing boom shown in FIG. 1, with the moving-head retracted.

In conventional systems the shuttle travel is always limited by the length of the shuttle assembly and the associated belt loop (47c), where the maximum travel is always less then the half of the boom length. FIG. 2 shows a traveling shiploader (91) with its telescoping chute (38a) and moving-head (35) retracted over a river barge (113) at the fender line (115). The total travel length (89) achieved or generated by the combination of the "compact loop-less multi-track moving head" and the "transpassing idlers" is significantly larger than the travel distance of the other types of shuttles and larger than the half boom length. Existing traveling shiploaders of the conventional shuttle type can only provide a travel distance less then half the boom length as described above.

"COMPACT MOVING-HEAD" CONVEYOR WITH "TRANSPASSING IDLERS"

FIG. 3 shows a typical conveyor system with a "compact moving-head" (35) and "transpassing idlers" with the system in its two extreme positions, extended and retracted. The transpassing idler without and with a return idler is indicated with the item numbers (50 and 50a), respectively.

Figure 10:
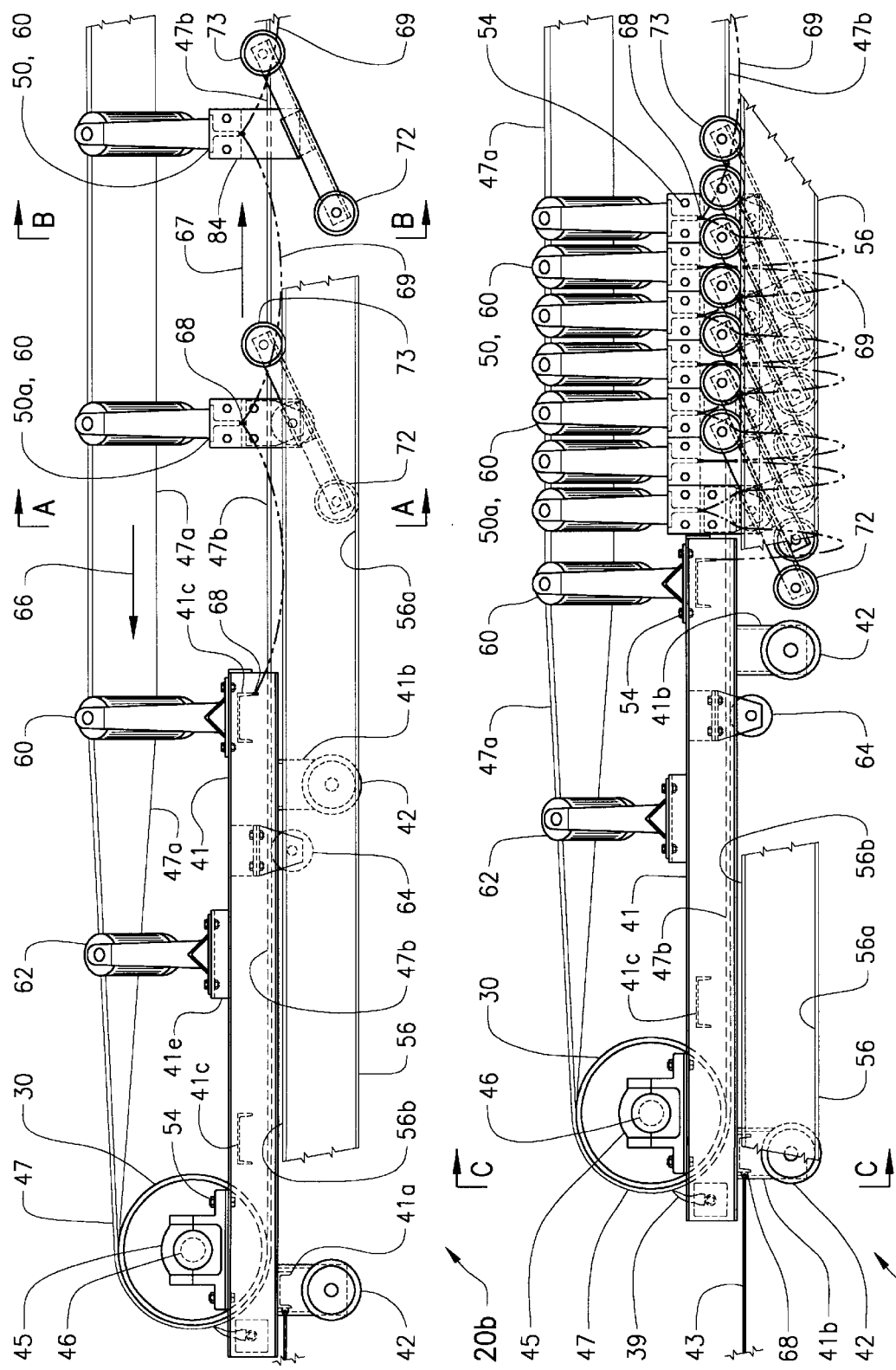
FIG. 10 illustrates the compact moving-head assembly with "transpassing idlers," in the extended and retracted conditions.
Figure 12:
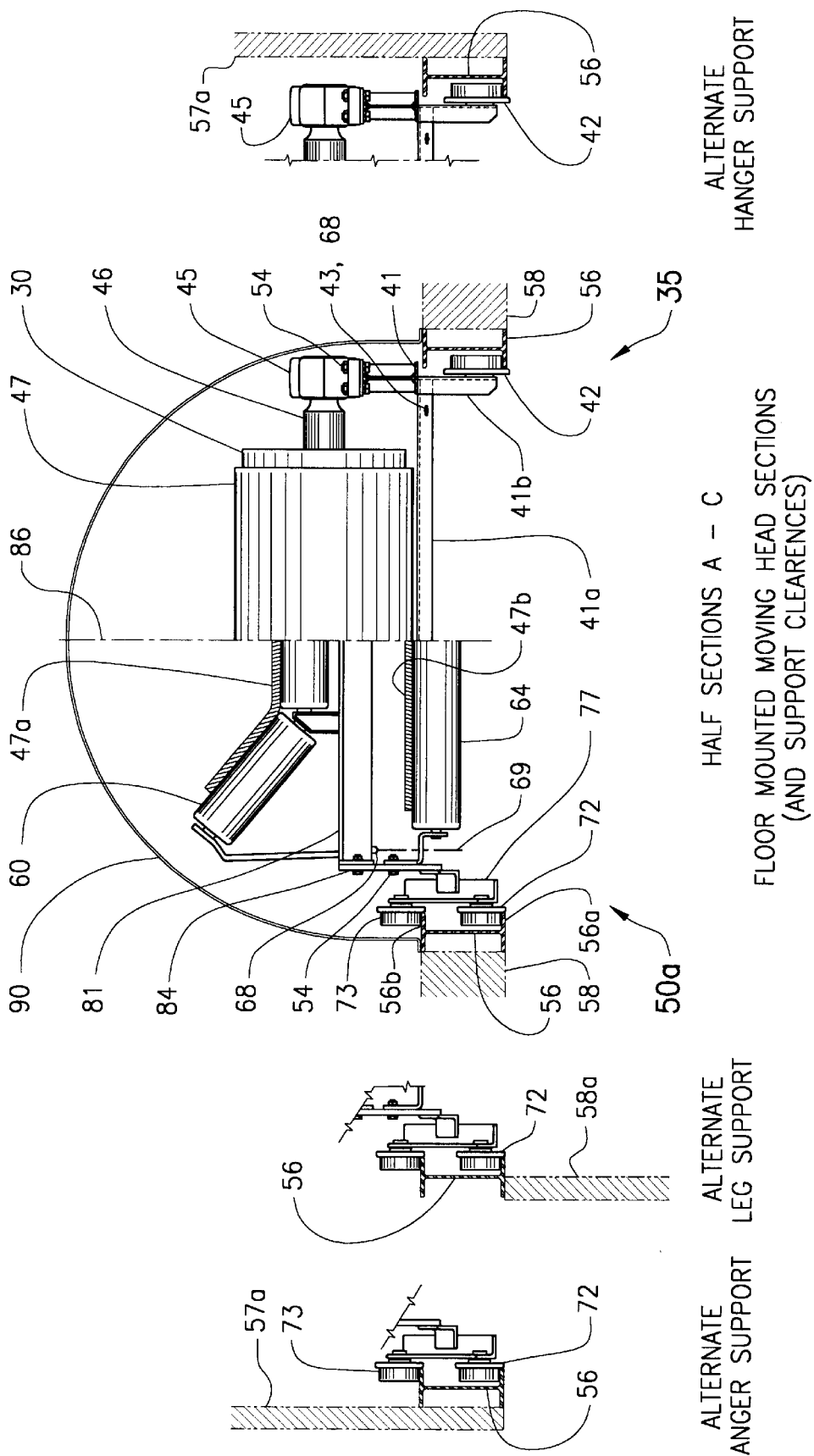
FIG. 12 illustrates Section A–C (from FIG. 10) of the floor mounted "transpassing idler" and moving-head sections.

The floor mounted arrangement of the moving-head assembly (35) shown on FIG. 3 and the enlarged details shown on FIG. 10, 11, and 12. This is an arrangement where the conveyor belt length change due the movements (89), as well as any belt stretch, associated with the moving head needs to be compensated by the take-up pulley (40). A new "constant" counterweight arrangement is shown on FIG. 9. The transpassing idlers (50 and 50a) equipped with four wheels running on four separate tracks comprised of two beams. The four tracks are the two inside flanges (56a, 56b) of two floor-mounted beams (56). Here, the front or lower (56a) and rear or upper tracks (56b) are offset in the vertical plane along the inside flanges (or outside flanges, not shown here) of each beam (56). As shown on FIG. 3, when the moving-head is retracted (20a), the front or lower wheel (72) of an idler assembly (50) can pass below the rear or upper wheel (73) of the adjacent idler assembly (50a) as well as a number of other adjacent idler assemblies. The idler wheels (72, 73) ride only on the inner flanges of each beam (56) that will allow the wheels (42) of the moving head structure (35) to share the lower tracks (56a) (flanges) with the front wheels (72) of the idler assemblies (50 and 50a). In turn this will allow for a very economical and flexible system with mounting possibilities at floor level (58), with legs from the floor (58a) or through suspension (57a) from the ceiling as shown on FIG. 12.

FIG. 10 is an enlargement of the moving-head assembly (35) with "transpassing idlers" (50 and 50a). Again, this drawing is showing the system in its two extreme positions extended and retracted (20b and 20c). The extended assembly shows the idler assemblies (50 and 50a) separated from each other and kept at equal (standard) spacing by means of a chain (69) fastened to the idler assembly frames by anchor shackles (68). The retracted assembly (20c) shows the idler assemblies (50 and 50a) stacked together kept apart by the frame's leg (84) at an equal minimal spacing with the connecting chains (69) slacking. The retracted idler spacing is controlled by the width of the frame leg (84) and be stacked with a minimum clearance of about ¼" between the rollers (60a) allowing for maximum moving head travel. This is achieved by allowing front wheels (72) of an idler assembly (50) to pass under the rear wheels (73) of the adjacent idler assembly (50a), which in turn is possible because the front (72) and rear wheels (73) running on separate tracks (56a and 56b). I.e., the front (lower) wheels (72) are stacked on the lower tracks (56a) while the rear (upper) wheels (73) are stacked on the upper tracks (56b).

FIG. 11 shows the floor mounted "transpassing idler" assembly in three projections. Section B-A, the plan and side views explain the functioning of the invention at hand. The section shows the assembly with (50a) and without a flat return idler (64), and plan view without the belt plus side view. The latter shows a single transpassing idler (50a) separated from four stacked transpassing idlers while the moving-head is only partially retracted.

The simplicity of the assembly (50) is readily apparent. By utilizing a slightly modified factory made standard troughing idler (60) mounted on a frame/cross member (81). This frame will be provided with two legs (84) connected through two brackets (85) to the equalizer arms (77), and to the upper or rear (73) g and lower or front (72) wheel assemblies. The assembly with a return idler (50a) will require the addition of a standard flat return idler (64), which does not require any special modification to the frame. The only modification required is the addition of two fasteners (54) in two mounting holes on each frame legs (84), as shown on FIG. 12.

FIG. 12 shows the floor mounted "transpassing idler" (50a) and the floor mounted moving-head (35) sections with alternative support methods (57a, 58a) and a standard conveyor hood cover (90). The system requires only two steel beams (56) (or four tracks) and only this type of system allows the tracks to be supported from the bottom (58a), the side (58) or from the top (57a). Also, this is the only system can be enclosed with a standard conveyor hood covers (90). These different mounting alternatives make this system suitable to be utilized in land based conveyors (20) as well as shiploader (91) or stacker boom applications generating a more compact boom cross section and corresponding lighter boom and machine construction. And, the utilization of a compact moving-head (35) instead of a shuttle (36) in combination with the "transpassing idlers" (50) allows for a very high ratio of extended versus retracted conveyor lengths.

FIG. 9 shows the operation of the "constant counterweight take-up" system. The standard drive mechanism of a shuttle or L moving-head may consist of a simple rack and pinion, chain or rope drive where the take-up and counterweight function independently. The current invention may accomplish those functions with one integrated arrangement. This is shown on the subject drawing. Here, the moving head traverse drive, the belt take-up and counterweight assembly is integrated into one system. This is achieved through an integrated rope drive or winch (37) and a wire rope reeving system. The reeving system consists of a high tension side (43) and a low tension part (43a). The high-tension side is reeved between the drive winch (37) and the moving-head (35) through a set of high-tension sheaves (79). In turn the low-tension side is reeved between the drive winch (37) and the counterweight (40) and the take-up pulley assembly (27) through a set of low-tension sheaves (79a). During moving-head (35) retraction (travel) the winch (37) is paying out (unwinding) wire rope (on the same drum) on the high tension side, while winding up wire rope on the low tension side, or vise versa. The function of the take-up pulley (27) is to compensate for moving-head movement and for elastic stretches of the belt during different load conditions. The first is explained above, and a simultaneous movement of the take-up pulley (27) and the counterweight (40) achieves the second, whereas both can occur at the same time. The system is shown with a double reeved wire rope system (43, 43a) but it is possible to have single or multiple reeved assemblies depending on conveyor belt tensions and moving-head travel drive speed requirements. The other benefit of the constant counterweight system is that a relatively light take-up pulley (27) will adjust to the changes in belt loop (47d) length (89), whereas, the heavy counterweight (40) is separated and kept safely near ground level in a nearly constant vertical position.

CONVENTIONAL SHUTTLE CONVEYOR WITH TRAVELING CATENARY IDLERS

FIG. 4 shows the conventional shuttle conveyor (21 and 21a) with traveling catenary idlers (52). This drawing shows the "try-out" system already in operation. This system utilizes a conventional belt-loop type shuttle (36) with a heavy frame structure (44) and a belt loop (47c) described by an additional fixed bend pulley (32) and a traveling shuttle tail pulley (33) assemblies with the system in its two extreme positions, extended (21) and retracted (21a).

In comparison, the belt loop type shuttle (FIG. 4) employs an additional fixed bend pulley (32) and a shuttle tail pulley (33) the assure a constant belt loop length during shuttle traversing, whereas the loop-less moving head with a "constant counterweight" utilizes an integrated reeving diagram between the take-up pulley and the counterweight to achieve the same.

The floor mounted shuttle assembly (36) shown on FIG. 4 and the enlarged details shown on FIG. 13 and 14. The traveling catenary idlers (52) are equipped with four wheels running on two ceiling mounted (suspended) steel beams (55). The two inside bottom flanges (55a) and the two outside bottom flanges (55b) of the suspended beams (55) are utilized as four separate tracks. Here, the front or outside (55b) and rear or inside (55a) tracks are offset in the horizontal plane along the bottom flanges of each beam. As shown on FIG. 4, when the shuttle is retracted (21a), the front or outside wheel (71) of an idler assembly (52) can pass the rear or inside wheel (70) of the adjacent idler assembly (52) as well as a number of other adjacent idler assemblies. The idler wheels (70, 71) ride on the ceiling mounted tracks (55a, 55b) whereas the shuttle assembly (36) will need a separate set of floor-mounted rails or tracks (56). This solution is not as flexible and economical as the floor mounted design; however, it is far better then other previously known systems shown on FIGS. 7 and 8 as described in the following sections. The take-up pulley (27) and/or counterweight (40) may function as shown here or as described in conjunction with FIG. 3.

FIG. 13 shows this type of first generation traveling catenary idler assembly (52) in three projections, section D—D, and plan view and side view explaining its functioning. The idlers (63) can be stacked with a small clearance between the catenary idler supports (82) allowing for somewhat less shuttle travel versus the "transpassing idler" (50, 50a) solution. The reason for the shorter travel distance is; a) the utilization of the shuttle assembly (36), which limits the total travel distance (89a); and b) the construction of the special catenary idlers (52), which requires somewhat more space in the stacked (retracted) condition versus the "transpassing idler" assembly (50, 50a). The special construction of the catenary idler assembly is due to clearance requirements. The catenary idler assembly (52) needs to clear the conveyor structure below and its longitudinal clearance requirement needs to be minimized, therefore the idler rolls (60a) need to be supported in front and the back of each set of idler rolls (60a). This requires the fabrication of a special bracket (83) to support or encase the rolls, which in turn increases the length of the catenary idler assembly (52) in comparison with the transpassing idler assembly (50, 50a). This catenary idler bracket construction will increase the retracted length of the shuttle (36) but will provide a better system then other currently available systems on the market.

FIG. 14 shows the ceiling mounted (suspended) traveling catenary idler assembly (52) and floor mounted shuttle assembly sections (36). Disadvantages: this solution requires two floor mounted (56) and two ceiling mounted track beams (55) or rails with the associated support structures (58 and 57); the idler assemblies (52) are complicated and require special fabrication and are expensive. Also, the utilization of a conventional shuttle (36) produces a lower ratio of extended versus retracted length (89a).

COMPACT FLOOR MOUNTED MOVING-HEAD CONVEYOR WITH IMPROVED TRAVELING CATENARY IDLERS

The floor mounted moving-head assembly (35) in conjunction with the improved catenary idler design (52a and 52b) is shown on FIG. 5 and the enlarged details are shown on FIG. 15 and 16. The system is shown in its two extreme positions, extended (22) and retracted (22a) with the corresponding travel distance (89b). Catenary idler assemblies (52) of the previous designs were simplified by removing the equalizer assembly (76), by widening its track and were improved by incorporating flat return idlers (64) with additional support hangers (83a) allowing to be used in conjunction with a compact moving-head (35). The utilization of the moving-head (35) with a light frame structure (41) eliminated the need for the fixed bend pulley (32) and a traveling shuttle tail pulley assemblies (33) and the corresponding belt loop (47c) described by the two pulleys. The take-up pulley (27) and/or counterweight (40) may function as shown here or as described with (FIG. 3).

The disclosed catenary idlers (52a and 52b) are equipped with four wheels running on two ceiling mounted steel beams (55). The two inside bottom flanges (55a) and the two outside bottom flanges (55b) of the suspended steel beam (55) are utilized as four separate tracks. Here, the front or outside (55b) and rear or inside (55a) tracks are offset in the horizontal plane along the inside and outside bottom flanges of each beam. As shown on FIG. 5, when the moving-head assembly (35) is retracted (22a), the front or outside wheel (71) of an idler assembly (52a) can pass the rear or inside wheel (70) of the adjacent idler assembly (52b) as well as a number of other adjacent idler assemblies. The idler wheels ride on the ceiling mounted tracks whereas the moving-head structure (35) will need a separate set of floor-mounted rails (56) or tracks. This solution is not as flexible and economical as the "transpassing idler" and floor mounted moving-head combination, and can utilize standard conveyor hood covers (90).

FIG. 15 shows the improved traveling catenary idler assembly (52a, 52b) in three projections, Section G-H, and plan view and side view explaining its function. The latter shows a simple idler assembly (52a) separated from four straddled idler assemblies (52a and 52b) while the moving head is only partially retracted. This version stacks the same way as the previous one having the same advantages and disadvantages. However, the incorporation of the flat return idler (64) facilitates the utilization of a compact moving-head (35) instead of a shuttle allowing for a higher ratio of extended versus retracted length.

The improvement or conversion of the catenary idler (52) with the incorporation of the flat return idler (64) requires more change in the fabrication process. The addition of a standard flat return idler (64) will require more modification to the frame, making the assembly heavier and more expensive.

FIG. 16 shows the ceiling mounted (suspended) improved traveling catenary idler (52b) and floor mounted moving-head sections (35) with the same mounting limitation as the previous assembly. Disadvantages: it requires two floor mounted (56) and two ceiling mounted track beams (55) or rails with the associated support structures (58 and 57); the idler assemblies (52a, 52b) are complicated and require special fabrication and are expensive. The utilization of a compact moving-head (35) produces a better ratio of extended versus retracted length versus a conventional shuttle (36).

COMPACT SUSPENDED MOVING-HAD CONVEYOR WITH IMPROVED TRAVELING CATENARY IDLERS

FIG. 6 shows a compact suspended moving-head (35a) conveyor with improved traveling catenary idlers (52a and 52b). It has the same characteristics as the previous design except it reduces the required number of tracks to two by suspending the movinghead (35a) from the tracks (55) shared by the suspended idlers (52a, 52b).

The ceiling mounted shuttle assembly (35a) shown on FIG. 6 and the enlarged details of the improved catenary idlers (52a and 52b) are shown on FIG. 15 and 17. The idler would be as discussed in conjunction with FIG. 15.

FIG. 17 shows the combined improved traveling catenary idler (52b) and suspended moving-head (35a) sections with the two track beams (55). This assembly by far is the best design utilizing the traveling catenary idler (52a) and suspended moving-head combination (35a), however, its utilization is limited (as all catenary idlers) to applications where no enclosure (i.e. standard conveyor hood cover 90) is required. Therefore, it is mostly useful in totally enclosed buildings of land based systems whereas the "transpassing idler" (50) system is suitable for all application including but not limited shiploader (91) barge loader and stacker booms.

CONVENTIONAL SHUTTLE CONVEYOR WITH STATIONARY CATENARY IDLERS (KNOWN ART).

The conventional floor mounted shuttle assembly (36) with stationary catenary idlers (51) is shown on FIG. 7 and the enlarged details of the stationary catenary idler (51) and shuttle sections (36) in the known double-decker design shown on FIG. 18.

FIG. 7 shows a conventional shuttle conveyor (24, 24a) with the double-decker solution of stationary catenary (51) and standard troughing idlers (60) mounted on a traveling shuttle assembly (36). This is the oldest and most commonly used shuttle design. The system comprises of a standard shuttle assembly (36) and a set of fixed catenary idlers (51) suspended from the ceiling structure (55). In the retracted position the shuttle assembly is stowed under the set of fixed catenary idlers (51). The carrying belt (47a) dips down from the level of the fixed catenary idlers (51) to the level of the standard troughing idlers (60) mounted on the shuttle frame (44) assembly. The system utilizes a conventional belt-loop type shuttle (36) with a heavy frame structure (44) and a belt loop (47c) described by an additional fixed bend pulley (32) and a traveling shuttle tail pulley (33) assemblies with the system in its two extreme positions, extended (24) and retracted (24a). The belt loop created by the utilization of the fixed pulley (32) and the traveling shuttle tail pulley (33) will compensate for the difference in belt length created by shuttle movements. This design solution carries all the shortcomings of the previously described shuttle designs plus its shuttling distance (89c) is limited to the length of the shuttle frame structure (44) as described in the introduction. Its size and four wheel design generates high concentrated loads and may require the utilization of heavy rails (56) and supporting structure (58).

CONVENTIONAL SHUTTLE CONVEYOR WITH CRADLE TYPE IDLERS (KNOWN ART).

Figure 8:
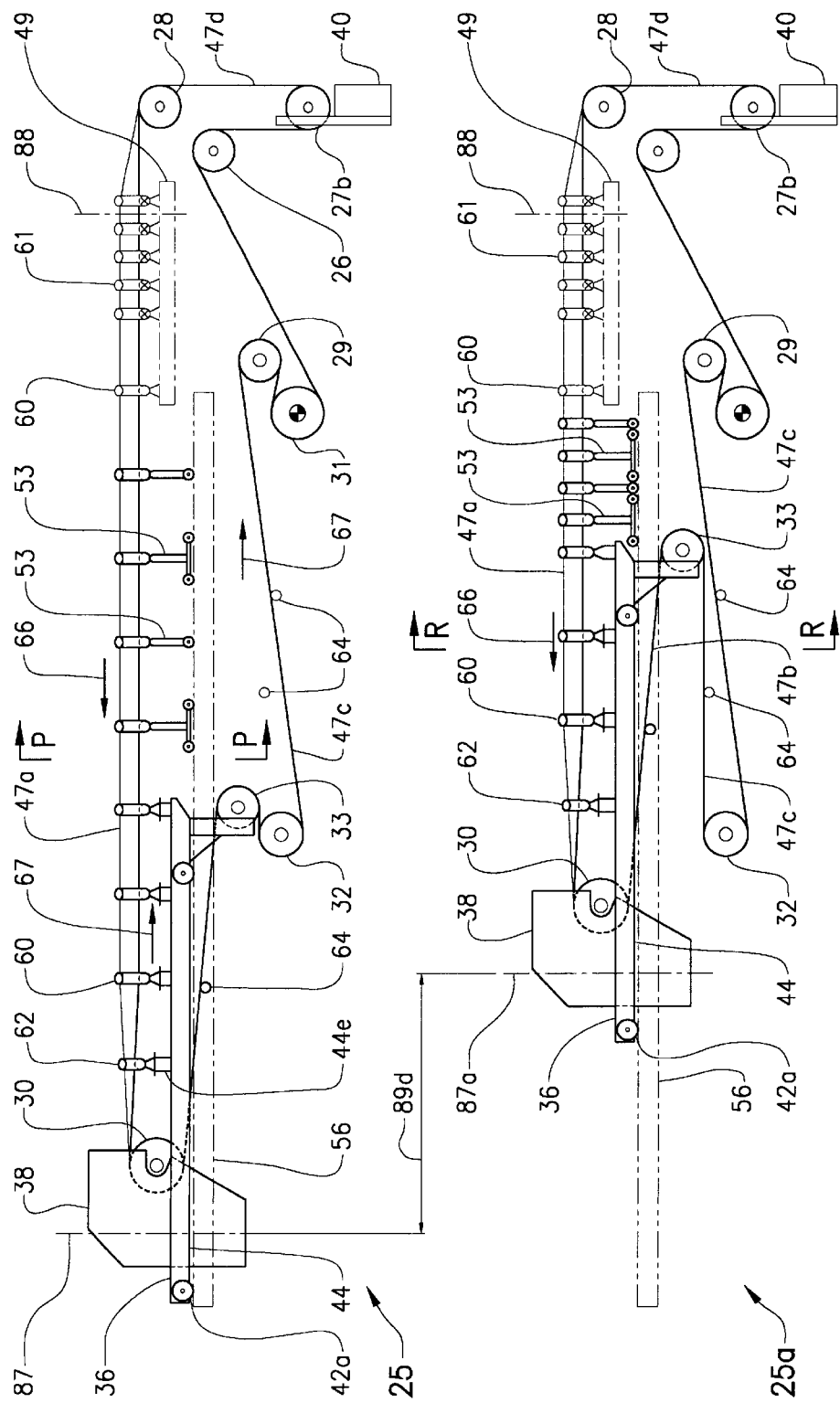
FIG. 8 illustrates the conventional shuttle conveyor with cradle type idlers.

FIG. 8 shows a conventional shuttle conveyor (25, 25a) with cradle type idlers (53) in three projections. Section D—D, plan and side view explains it's functioning. This system has the disadvantages of the other conventional shuttles (36) and has a much lower extended to retracted length ratio due to its idler frame (53) design.

Figure 19:
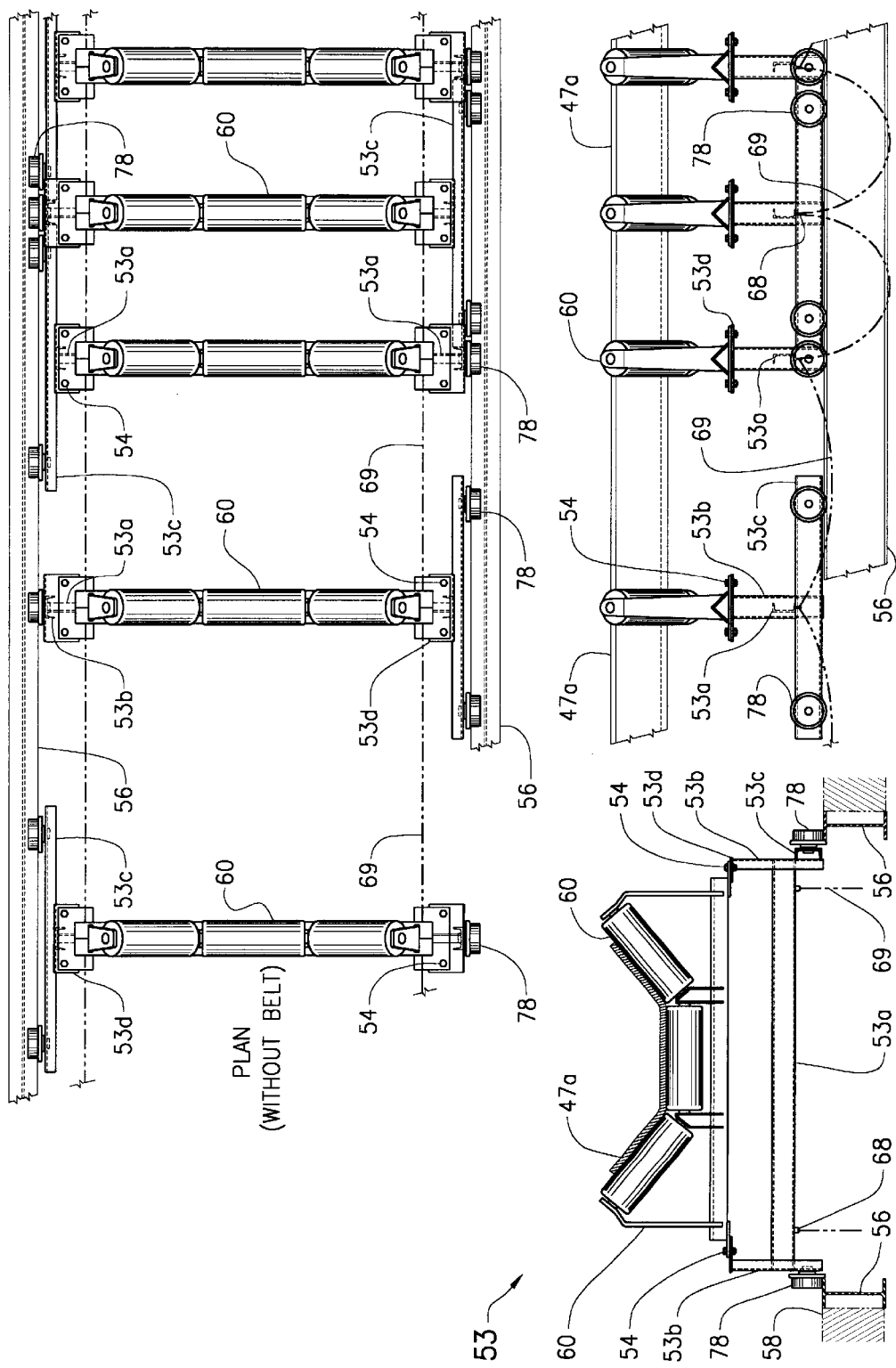
FIG. 19 illustrates Section P (from FIG. 8) of the conventional cradle idler assembly.

FIG. 19 shows a conventional cradle idler (53) assembly. A variation on the traditional system involves the use of traveling "cradle" idler assemblies (53) on two rails (56). These idler assemblies are mounted on three wheels (78) in a narrow "tee" (T) formation, with two wheels (78) running on one rail (56) and a single wheel (78) on the other rail (56). The idlers (53) are staggered on the rail (56), the first assembly (53) having two wheels (78) on one rail (56) while the second assembly (53) has its single wheel (78) on the same rail (56). When the shuttle (25a) is retracted, this system basically moves the idler assemblies closer to one another. Front and rear wheels are not allowed to pass one another. This can reduce the troughing idler spacing of conveyor belts by 30% to 40%. Among the disadvantages of this system is the tendency of the idler assemblies to de-track due to their "tee" shape.

FIG. 20 shows the conventional cradle idler assembly (53) and shuttle sections (36). A standard conveyor hood cover (90) can enclose this system, however, its poor extended to retracted length ratio limits its utilization mostly to horizontal take-up assemblies.

Thus it can be appreciated that the above described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

What is claimed is:

1. A generally symmetrical, floor mounted movable idler support for use with an extensible conveyor system that uses at least one moving idler support to extend over a surface, the idler support comprising:

a base with sides, a front section and a rear section, the front portion of the base being adapted for cooperating with the rear portion of a similar base, such that the front portion of the base accepts the rear portion of the similar base to allow stacking of the bases, each of the sides of the base having pair of spaced apart supports, each of the supports extending along a line that is at an angle to the surface;

an idler support frame mounted over said supports and between the front portion and the rear portion of the base, so that several of the support frames can be nested against one another to reduce the overall space taken up by the support frames.

2. An idler support according to claim 1 wherein each of the supports of said base include wheels mounted on the supports, at least one wheel being mounted at a different height from the surface.

3. An idler support according to claim 1 wherein the front portion of said base is closer to the surface than the rear portion of the base.

4. An idler support according to claim 1 wherein said surface is defined by a pair of spaced apart, generally parallel rails.

5. An idler support according to claim 1 wherein said supports are parallel to one another.

6. A generally symmetrical, floor mounted moving idler support for use with an extensible conveyor system that uses at least one moving idler support to extend over a pair of spaced apart tracks, each track having a pair of spaced apart generally parallel surfaces, the idler support comprising:

a base with sides, a front section and a rear section, the front portion of the base being adapted for cooperating with the rear portion of a similar base, such that the front portion of the base accepts the rear portion of the similar base to allow stacking of the bases, each of the sides of the base having pair of spaced apart supports, each of the supports extending along a line that is at an angle to the generally parallel surfaces of the tracks and engaging each of the parallel surfaces of the tracks;

an idler support frame mounted over said supports and between the front portion and the rear portion of the base, so that several of the support frames can be nested against one another to reduce the overall space taken up by the support frames.

7. An idler support according to claim 6 wherein each of the supports of said base include wheels mounted on the supports, at least one wheel being mounted at a different height from the surface.

8. An idler support according to claim 7 wherein the front portion of said base is narrower than the rear portion of the base.

9. An idler support according to claim 6 the pair of spaced apart tracks includes a pair of spaced apart I-beams.

10. An idler support according to claim 6 wherein said supports are parallel to one another.

11. A method for supporting and extending a floor mounted extensible conveyor, the method comprising:

providing a moving idler support comprising:

a base with sides, a front section and a rear section, the front portion of the base being adapted for cooperating with the rear portion of a similar base, such that the front portion of the base accepts the rear portion of the similar base to allow stacking of the bases, each of the sides of the base having pair of spaced apart supports, each of the supports extending along a line that is at an angle to the surface;

an idler support frame mounted over said supports and between the front portion and the rear portion of the base, so that several of the support frames can be nested against one another to reduce the overall space taken up by the support frames;

extending the extensible conveyor by moving the base along the floor; and contracting the extensible conveyor by moving the base along the floor until the base nests within a succeeding base.

12. A method according to claim 11 wherein each of the supports of said base include wheels mounted on the supports, at least one wheel being mounted at a different height from the surface.

13. A method according to claim 11 wherein the front portion of said base is closer to the surface than the rear portion of the base.

14. A method according to claim 11 wherein said surface is defined by a pair of spaced apart, generally parallel rails.

15. A method according to claim 11 wherein said supports are parallel to one another.

16. A method according to claim 11 and further comprising a constant counterweight system for maintaining constant tension on the conveyor.

* * * * *